United States Patent
Hanna et al.

(10) Patent No.: US 10,570,912 B2
(45) Date of Patent: Feb. 25, 2020

(54) SLIDABLE SLEEVE ACTUATION SYSTEM FOR A TURBOCHARGER COMPRESSOR

(71) Applicant: Ford Global Technologies, LLC, Dearborn, MI (US)

(72) Inventors: David R. Hanna, Troy, MI (US); Leon Hu, Dearborn, MI (US); Daniel William Kantrow, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 15/603,139

(22) Filed: May 23, 2017

(65) Prior Publication Data
US 2018/0340544 A1    Nov. 29, 2018

(51) Int. Cl.
| | |
|---|---|
| F04D 27/02 | (2006.01) |
| F04D 29/68 | (2006.01) |
| F02B 37/24 | (2006.01) |
| F04D 29/46 | (2006.01) |
| F02C 6/12 | (2006.01) |
| F02B 37/22 | (2006.01) |
| F01D 17/14 | (2006.01) |
| F02B 37/12 | (2006.01) |

(52) U.S. Cl.
CPC ......... *F04D 27/0246* (2013.01); *F01D 17/14* (2013.01); *F02B 37/225* (2013.01); *F02B 37/24* (2013.01); *F02C 6/12* (2013.01); *F04D 29/464* (2013.01); *F04D 29/685* (2013.01); *F02B 2037/125* (2013.01); *F05B 2270/1081* (2013.01); *F05D 2220/40* (2013.01)

(58) Field of Classification Search
CPC ............................... F05B 2270/1081
See application file for complete search history.

(56) References Cited

U.S. PATENT DOCUMENTS

| | | | |
|---|---|---|---|
| 4,930,978 A * | 6/1990 | Khanna | F04D 29/4213 415/58.3 |
| 6,648,594 B1 | 11/2003 | Horner et al. | |
| 8,230,683 B2 * | 7/2012 | Fledersbacher | F01D 17/141 415/157 |

(Continued)

FOREIGN PATENT DOCUMENTS

CN          105065328 A    11/2015

*Primary Examiner* — Dwayne J White
*Assistant Examiner* — Jason G Davis
(74) *Attorney, Agent, or Firm* — Geoffrey Brumbaugh; McCoy Russell LLP

(57) ABSTRACT

Methods and systems are provided for a slidable sleeve valve actuation system for a turbocharger compressor. In one example, an actuator assembly for a slidable sleeve of a turbocharger compressor may comprise: a fork arm coupled to the slidable sleeve; a rotatable lever arm coupled to the fork arm via a rigid connecting shaft; a connector rod coupled between the lever arm and a rotatable element; and an actuator unit coupled to the rotatable element and attached to an attachment case, the attachment case coupled to the turbocharger compressor. The actuator assembly may be actuated to move the slidable sleeve from one position along a casing treatment to another position along the casing treatment, thereby adjusting the alignment of sleeve slots on the slidable sleeve relative to choke or surge slots on the casing treatment.

16 Claims, 10 Drawing Sheets

(56) References Cited

U.S. PATENT DOCUMENTS

| | | |
|---|---|---|
| 8,517,664 B2 | 8/2013 | Sun et al. |
| 8,696,299 B2* | 4/2014 | Bywater ................. F02B 37/16 |
| | | 415/1 |
| 2012/0230814 A1* | 9/2012 | Fledersbacher ....... F01D 17/141 |
| | | 415/159 |
| 2014/0377051 A1 | 12/2014 | Sun et al. |
| 2016/0160756 A1 | 6/2016 | McGahey et al. |

* cited by examiner

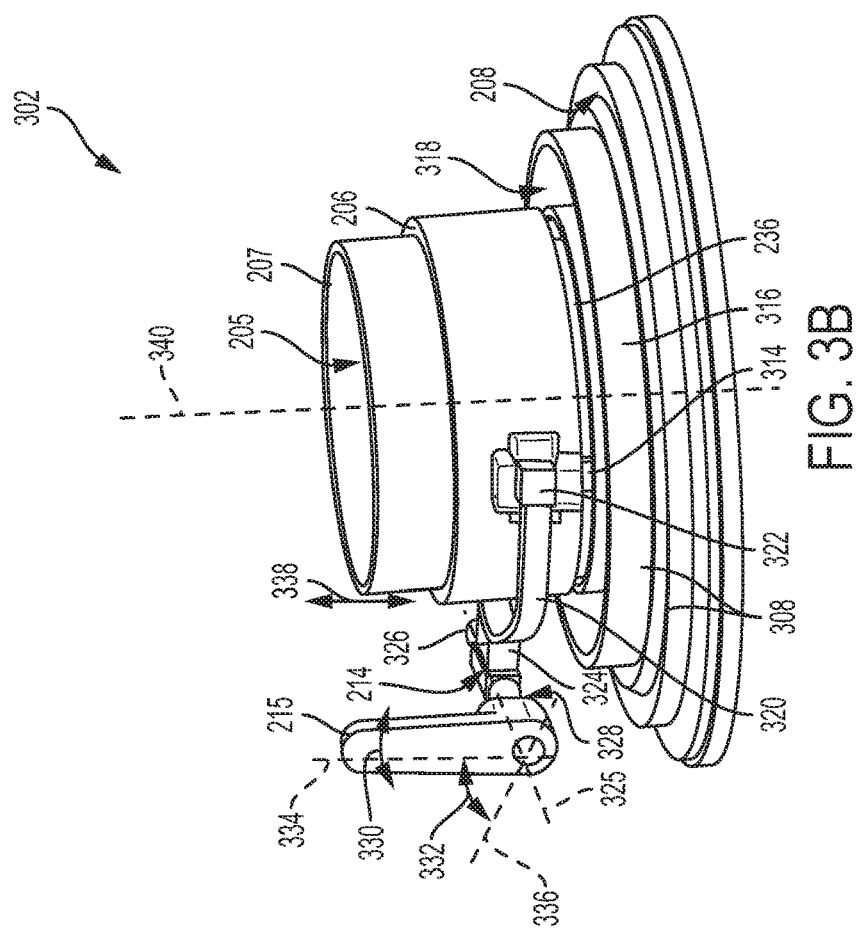
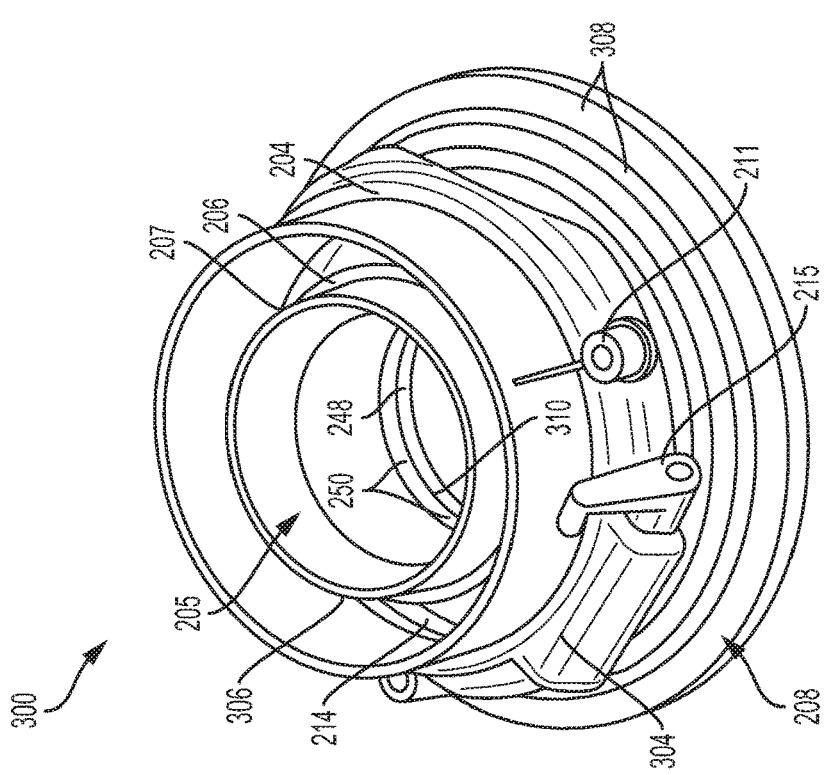

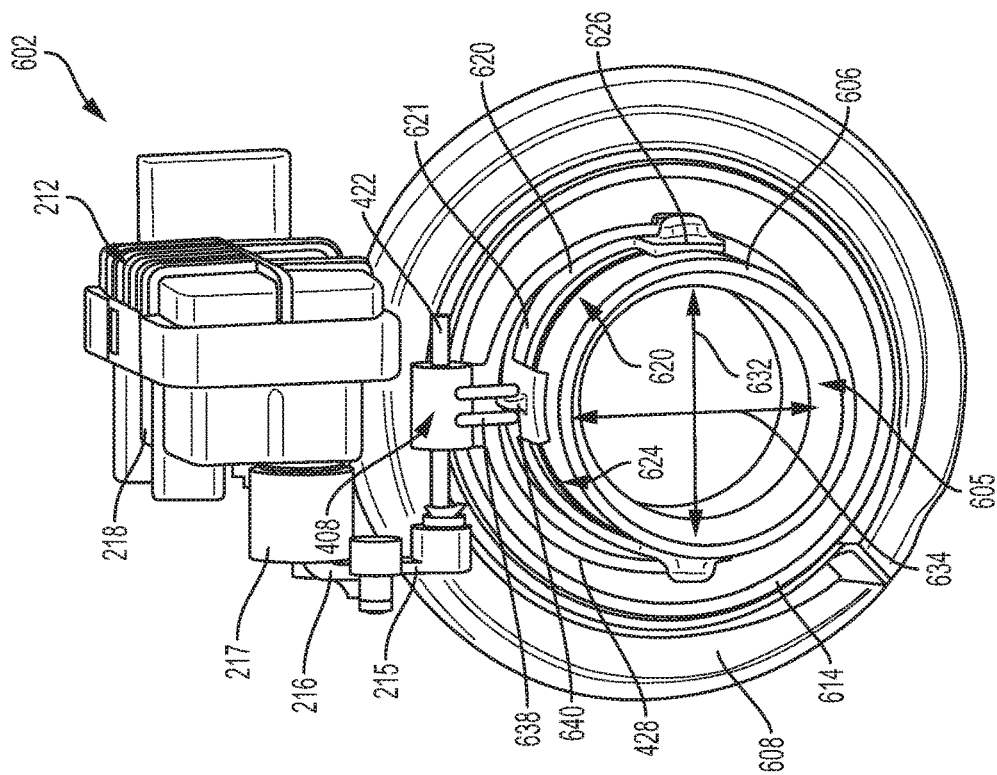
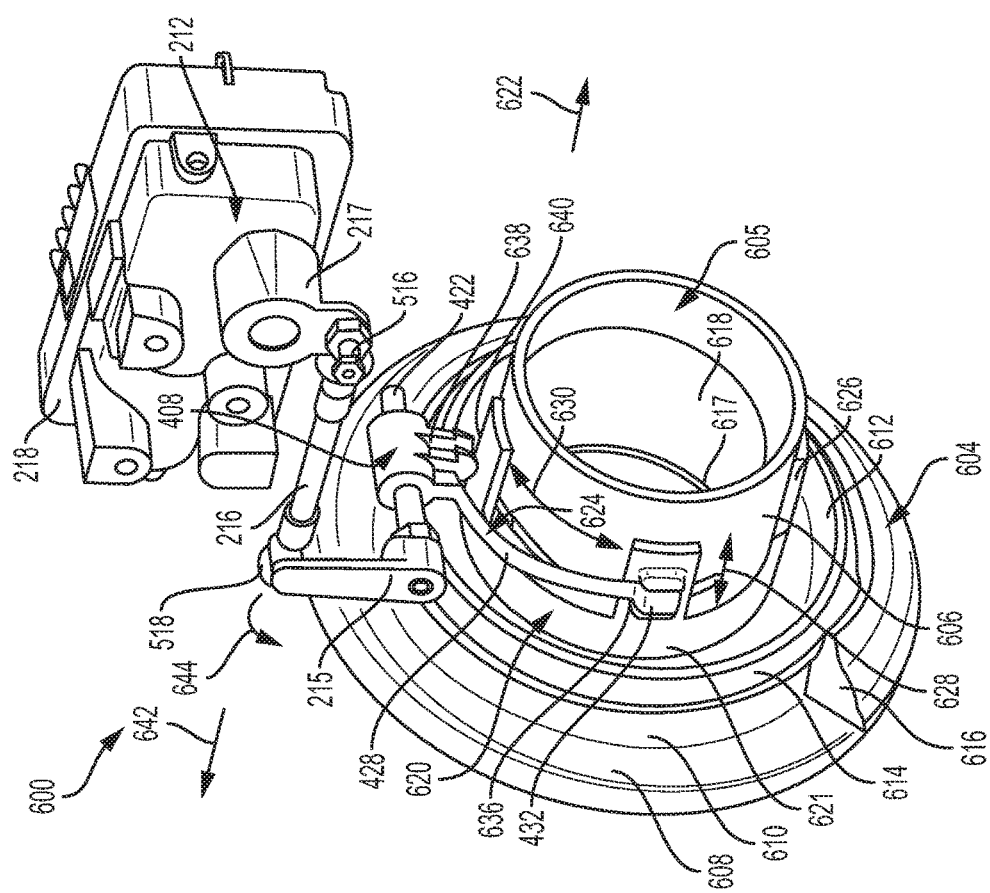

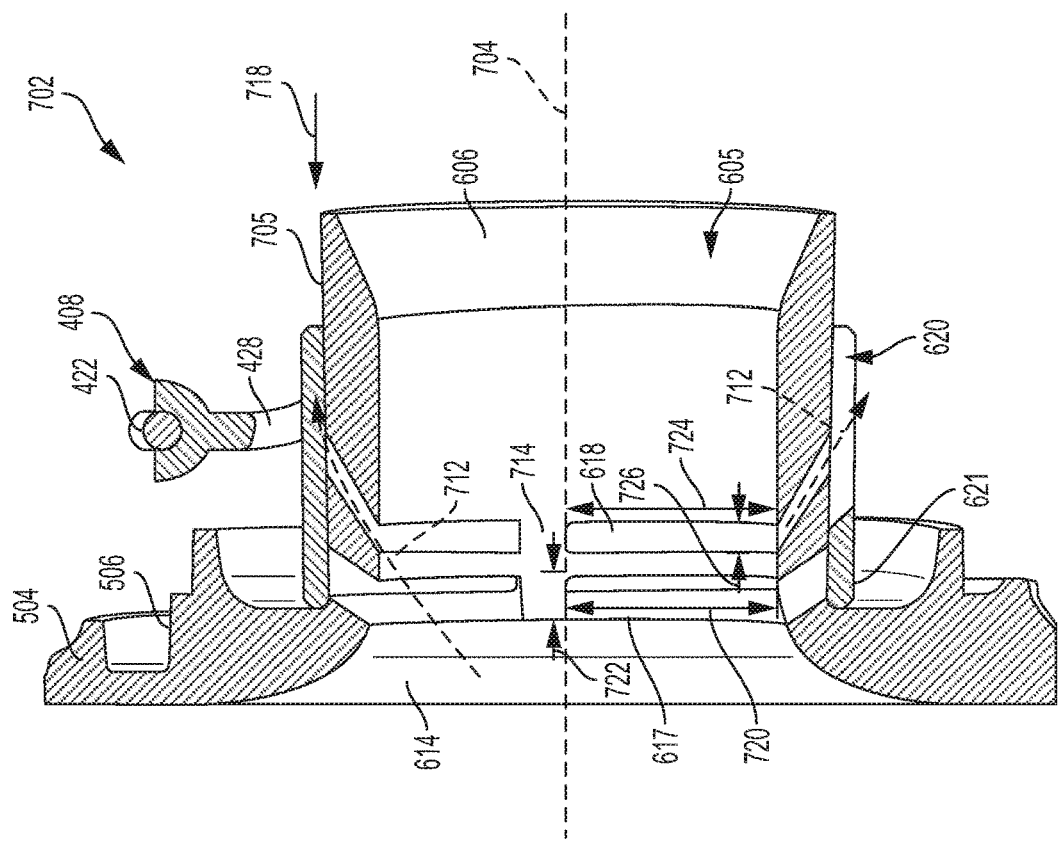
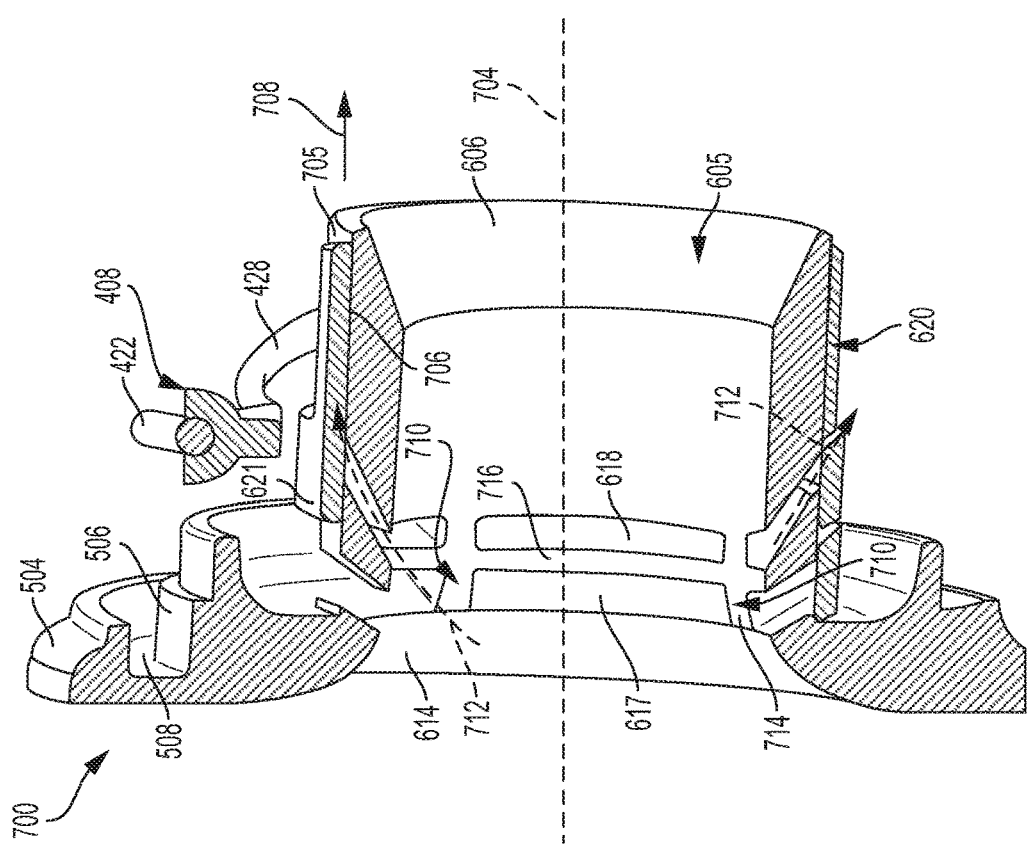

SLIDABLE SLEEVE ACTUATION SYSTEM FOR A TURBOCHARGER COMPRESSOR

FIELD

The present description relates generally to methods and systems for a slidable sleeve actuation system for a turbocharger compressor.

BACKGROUND/SUMMARY

A turbocharger may be provided in an engine to improve engine torque or power output density. The turbocharger may include an exhaust driven turbine coupled to a compressor via a drive shaft. The compressor may be fluidly coupled to an air intake manifold in the engine connected to a plurality of engine cylinders. Exhaust flow from one or more engine cylinders may be directed to a turbine wheel causing the turbine to rotate about a fixed axis. The rotational motion of the turbine drives the compressor which compresses air into the air intake manifold to increase boost pressure based on engine operating conditions.

The compressor may include a sleeve having a plurality of sleeve slots, which may be selectively aligned with either a bleed slot or recirculation slot on a casing shroud coupled to the sleeve to control air flow conditions in the compressor based on turbocharger and/or engine operating conditions. In this way, the position of the sleeve may be selectively adjusted relative to the casing shroud to address choke or surge conditions. However, adjusting the position of the sleeve along the casing shroud to align the sleeve slots with either the choke or surge slots or to block both the choke and surge slots during engine operation may pose challenges and may lead to flow leakage or affect compressor performance. For example, misalignment of the sleeve slots relative to either the choke or surge slots may occur when the sleeve is improperly adjusted relative to the casing shroud, thereby creating openings in the compressor that may allow air leakage. Increased air flow leakage in the compressor system may decrease compressor efficiency. Further, the sleeve may bind to the casing treatment when actuated, which may create difficulty when adjusting compressor flow geometry.

One example approach for addressing the above problems in a turbocharger compressor is shown by Sun in U.S. patent number 2014/0377051. Therein, a system is disclosed that includes a turbocharger compressor having an actuatable annular disk comprising a first group of choke slots, an outer annular disk comprising a second group of choke slots, and an actuator to rotate the actuatable annular disk relative to the outer annular disk to vary alignment of the choke slots on both disks. The compressor further includes a bleed port that is fluidly coupled to a compressor inlet and is continuously open during engine operation.

However, the inventors herein have recognized potential issues with such a system. As one example, due to the complex nature of the system, misalignment of the actuatable and outer annular disks may occur when the actuatable disk is adjusted from one position relative to the outer disk to another position. In this case, misalignment of the actuatable and outer annular disks may cause flow leakage in the casing shroud which may affect the performance of the compressor. In another example, since the surge slot is always open during engine operation, air may be continuously recirculated from the compressor wheel back to the compressor inlet. Continuous recirculation of air in the turbocharger compressor may not be always necessary, especially when compressor conditions or engine operating conditions do not warrant constant air flow recirculation.

In one example, the issues described above may be addressed by an actuator assembly for a slidable sleeve of a turbocharger compressor, comprising: a fork arm coupled to the slidable sleeve; a rotatable lever arm coupled to the fork arm via a rigid connecting shaft; a connector rod coupled between the lever arm and a rotatable element; and an actuator unit coupled to the rotatable element and attached to an attachment case, the attachment case coupled to the turbocharger compressor. In this way, an engine controller may control the actuator assembly to move the slidable sleeve to a position along a casing treatment, thereby adjusting the alignment of sleeve slots on the slidable sleeve relative to choke or surge slots on the casing treatment to accommodate a wide range of airflow conditions while increasing compressor efficiency.

For example, the actuator unit of the actuator may receive a signal from the controller and then the actuator actuates the rotatable element which moves the connector rod coupled to the rotatable lever arm. The motion of the connector rod rotates the lever arm which in turn moves the fork arm and slidable sleeve along the casing treatment to vary alignment of sleeve slots on the slidable sleeve relative to choke and surge slots on the casing treatment.

In another example, an engine controller may control the actuator to move the slidable sleeve to a position relative to the casing treatment where the sleeve slots are aligned with choke slots (e.g., chokes slots are open) on the casing treatment and not aligned with the surge slots (e.g., surge slots are closed) on the casing treatment. In this case, air may be delivered to a compressor wheel in the casing treatment via the choke slots, thereby extending choke flow capacity. In another example, the slidable sleeve may be moved to a position relative the casing treatment where the sleeve slots are not aligned with either choke slots (e.g., chokes slots are closed) and aligned with the surge slots (e.g., surge slots are open). In this case, air entering the compressor may be recirculated via the surge slots to extend the surge margin.

The actuator assembly coupled to the slidable of the compressor may confer several advantages. For example, movement of the rotatable element, connector rod and lever arm allow the fork arm and slidable sleeve to slide along the casing treatment (to vary alignment of the sleeve slots relative to the choke and surge slots) without taking up much space and/or fits within a space allowed by a geometry of the compressor (e.g., adjacent to the volute of the compressor). In this case, the actuator assembly provides for a more compact system that varies compressor flow geometry to accommodate a wide range of flow conditions. Further, the fork arm and slidable sleeve may move only in an axial direction parallel to the inlet air flow and a rotational axis of the compressor. In this way, the actuator assembly may be configured to move the slidable sleeve quickly to meet engine requirements with minimal torque requirement, while reducing the cost of the actuator.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows a 3-D view of an inlet adapter enclosing the first embodiment of the slidable sleeve coupled to the casing treatment of the compressor.

FIG. 3B shows a 3-D view of the first embodiment of the slidable sleeve coupled to the casing treatment, with the inlet adapter removed.

FIG. 6A shows a 3-D view of the actuator coupled to a second embodiment of the slidable sleeve enclosing an inner casing of an alternative embodiment of the casing treatment.

FIG. 6B shows an alternative 3-D view of the actuator coupled to the second embodiment of the slidable sleeve enclosing the inner casing of the alternative embodiment of the casing treatment.

FIG. 7A shows a cross sectional view of a portion of the alternative embodiment of the casing treatment coupled to the second embodiment of the slidable sleeve adjusted to a first position.

FIG. 7B shows a cross sectional view of the portion of the alternative embodiment of the casing treatment coupled the second embodiment of the slidable sleeve adjusted to a second position.

FIGS. 2A-8 are shown approximately to scale, although other relative dimensions may be used, if desired.

DETAILED DESCRIPTION

Figure 1:
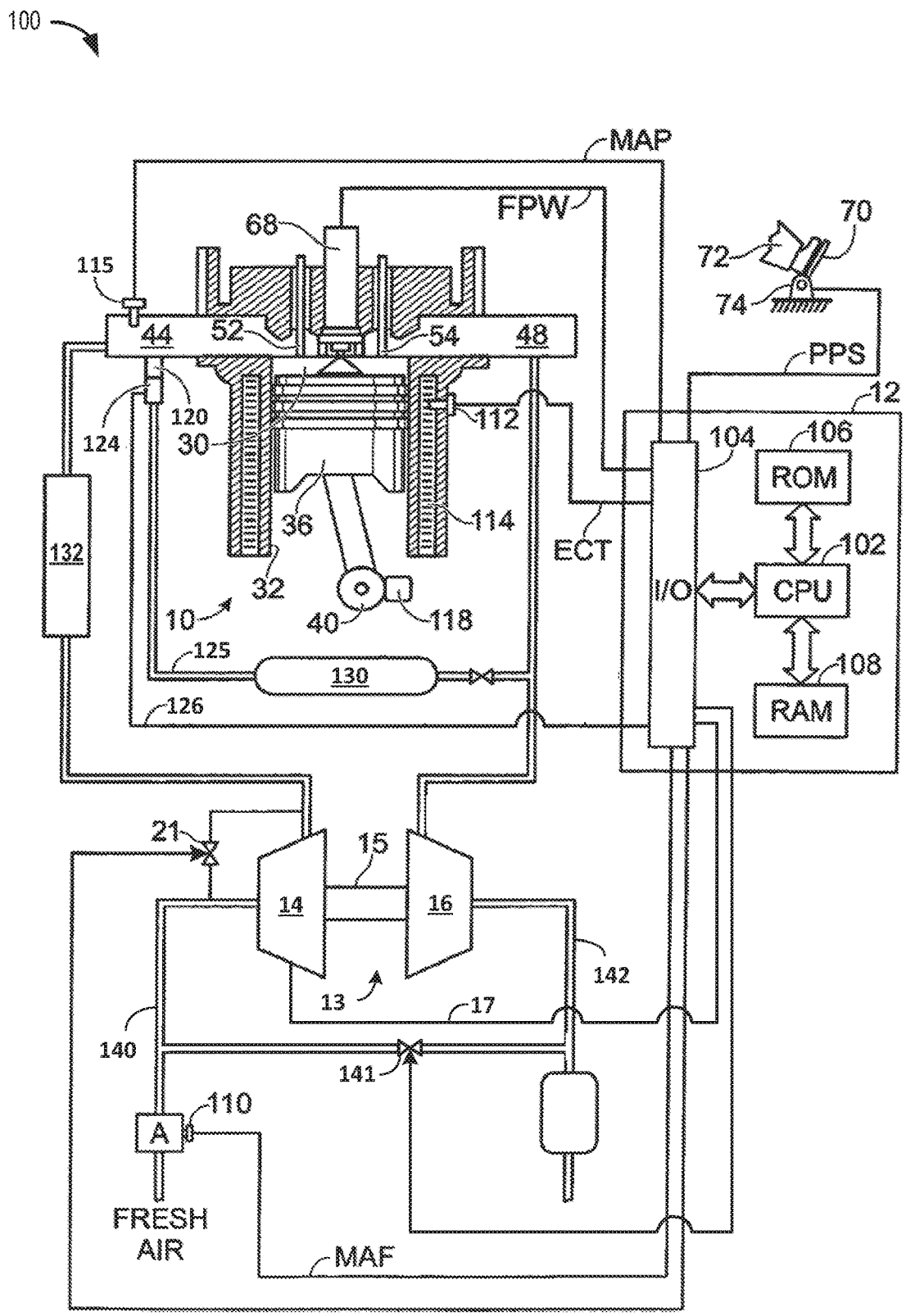
FIG. 1 shows a schematic view of a turbocharged engine having a compressor and a turbine.
Figure 2A:
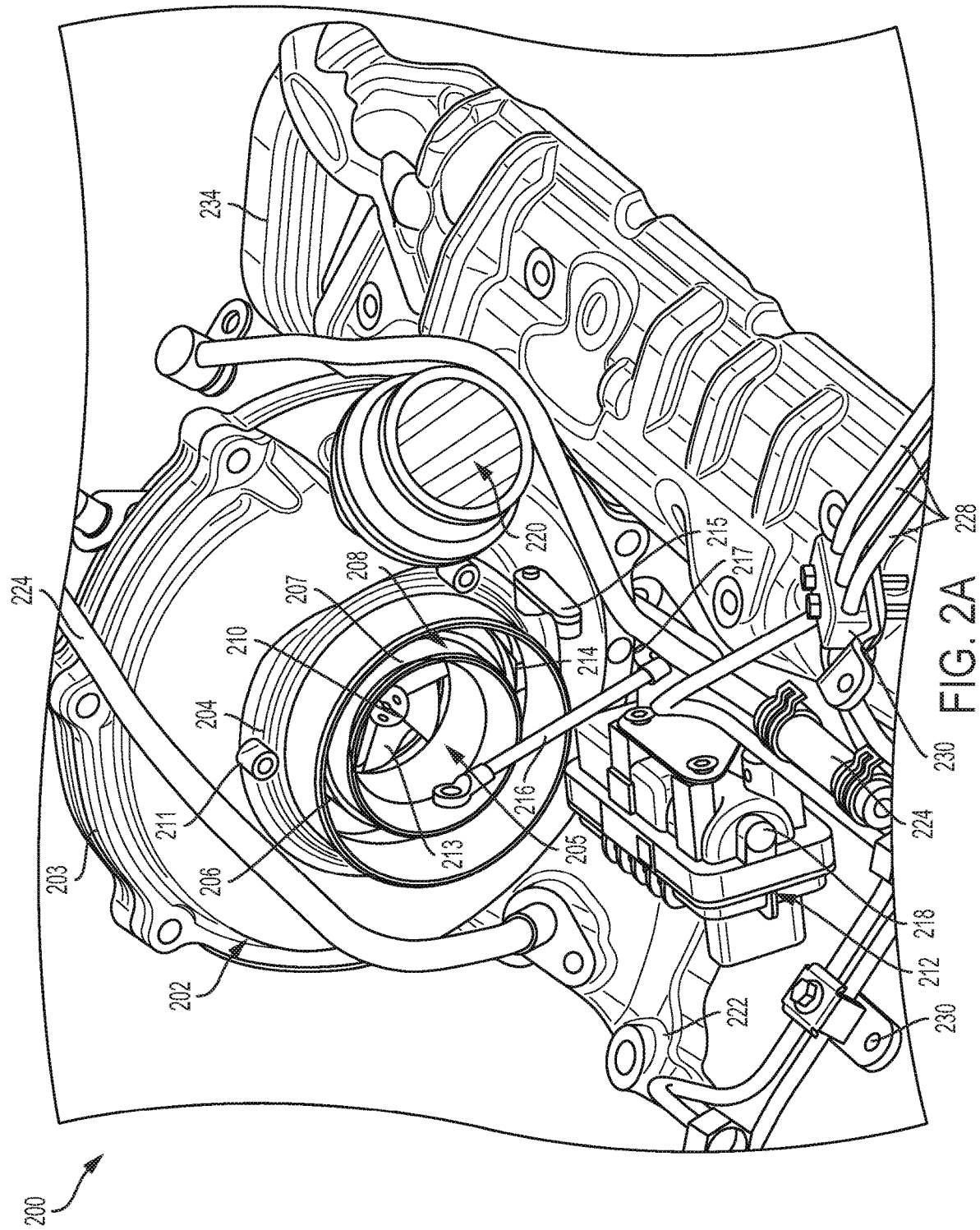
FIG. 2A shows a 3-D view of a turbocharger compressor having a first embodiment of a slidable sleeve coupled to a casing treatment of the compressor.

The following description relates to systems and methods for a slidable sleeve actuation system for a compressor of a turbocharger. As shown in FIG. 1, the turbocharger may include an exhaust driven turbine coupled to a compressor via a drive shaft. The rotational motion of the turbine drives the compressor which compresses air into an air intake manifold connected to one or more engine cylinders to improve boost pressure based on engine operating conditions. FIG. 2A shows a three-dimensional view of a compressor of a turbocharged engine. The compressor may include an inlet adapter coupled to a compressor housing via a plurality of fasteners, and a first embodiment of a slidable sleeve coupled to an inner casing of a casing treatment of the compressor. The inner casing of the casing treatment may accommodate a portion of a compressor wheel. As an example, the compressor wheel may be positioned inside the casing treatment to compress air that enters the compressor via an inlet coupled to an air intake manifold, such as the intake manifold disclosed with reference to FIG. 1. The compressed air exits the compressor via an outlet that may be coupled to the air intake manifold, where the air is delivered to intake ports of one or more engine cylinders.

Figure 2B:
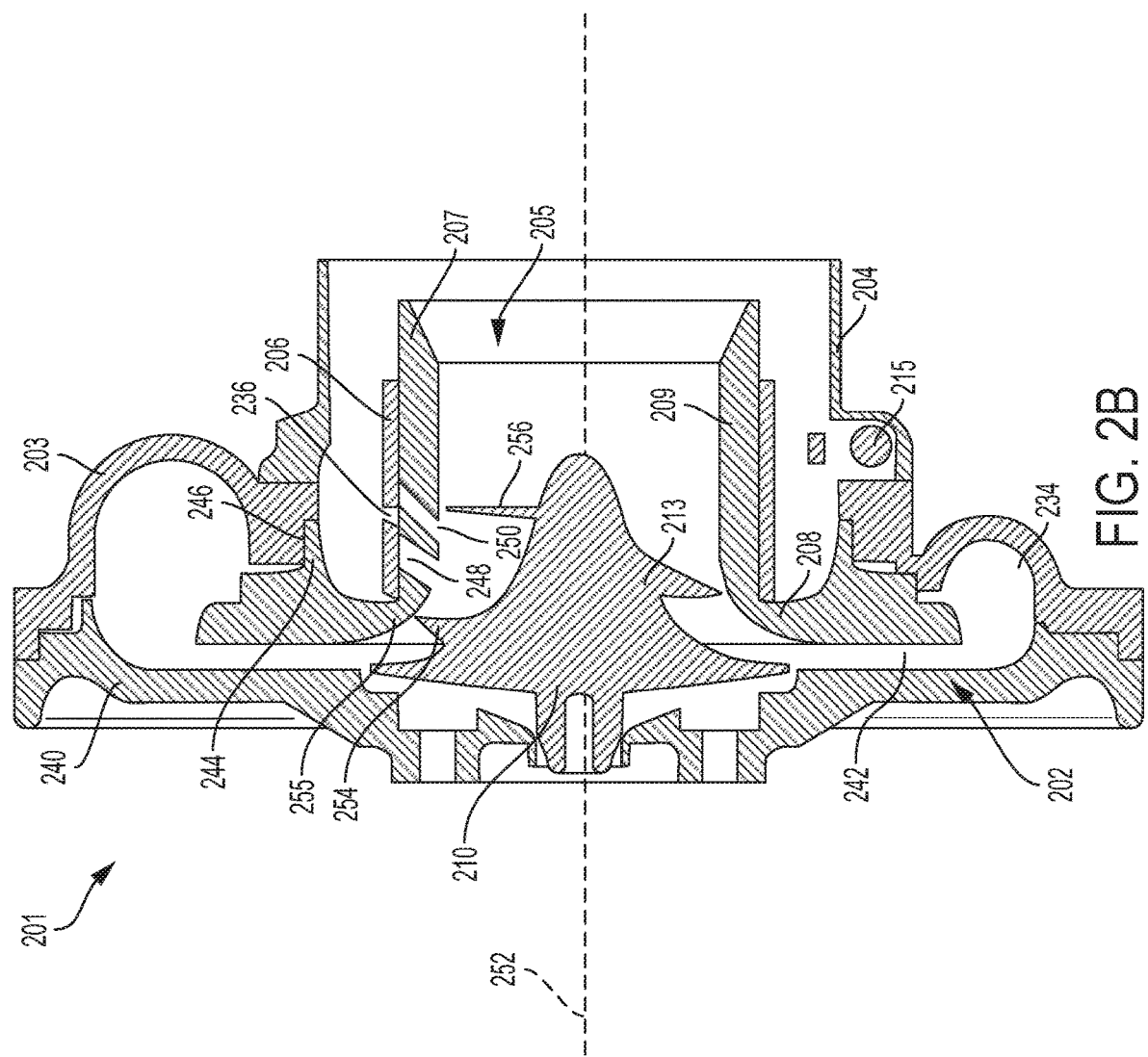
FIG. 2B shows a cross sectional view of the turbocharger compressor having the first embodiment of the slidable sleeve coupled to the casing treatment of the compressor.

The first embodiment of the slidable sleeve coupled to the inner casing treatment may include a plurality of sleeve slots, as disclosed herein with reference to FIG. 2B. The plurality of sleeve slots on the slidable sleeve may be aligned with a plurality of choke slots or surge slots on the inner casing of the casing treatment to vary flow geometry of the compressor. The actuator coupled to the slidable sleeve may be controlled via an engine controller to adjust the position of the slidable sleeve relative to the inner casing of the casing treatment to vary alignment of the sleeve slots on the slidable sleeve relative to the choke and surge slots on the inner casing, based on engine operating conditions, as disclosed herein with reference to FIG. 3A through FIG. 5B.

The first embodiment of the slidable sleeve may be referred to herein as a three position sleeve design corresponding to the first, second, and third positions of the slidable sleeve relative to the inner casing. In the first position, the choke slots on the inner casing of the casing treatment are open (e.g., not blocked by the slidable sleeve) and surge slots on the inner casing are closed (e.g., blocked by the slidable sleeve), and in the second position, both the choke slots and surge slots are closed. In the third position, the choke slots are closed while the surge slots are open. When the actuator is adjusted via the engine controller, a position of the slidable sleeve relative to the inner casing may be adjusted by moving a connector rod that couples to a lever arm of the actuator which in turn moves a fork arm coupled to the slidable sleeve, as disclosed herein with reference to FIG. 4A through FIG. 5B.

For example, the slidable sleeve may be moved to the first position where the sleeve slots are aligned with the choke slots while the surge slots are closed. When the sleeve slots on the slidable sleeve are aligned with the choke slots on the inner casing, air may enter the compressor via the choke slots to minimize or reduce choke conditions. In this example, the surge slots are not aligned with the sleeve slots, and therefore no air is recirculated back into the compressor inlet via the surge slots.

In another example, the slidable sleeve may be moved to the second position where the sleeve slots are not aligned with both the choke and surge slots on the inner casing of the casing treatment. Since the choke and surge slots are closed, no air is delivered to the compressor wheel via the choke slots, and no air is recirculated back into the compressor inlet via the surge slots. The air entering the compressor via the inlet may be compressed by the compressor wheel and delivered to the engine cylinders (via the intake manifold) to meet engine operating conditions.

In an alternative example, the actuator may be controlled to actuate the slidable sleeve to the third position where the sleeve slots are aligned with the surge slots but the choke slots are closed. In this case, a portion of the air flow in the inner casing is recirculated back into the compressor inlet to extend the surge margin. In this way, the actuator may be actuated to move the slidable sleeve from one position relative to the inner casing of the casing treatment to another position along the inner casing to accommodate a wide range of air flow conditions in the compressor while reducing air flow leakage and improving turbocharger efficiency.

Figure 4B:
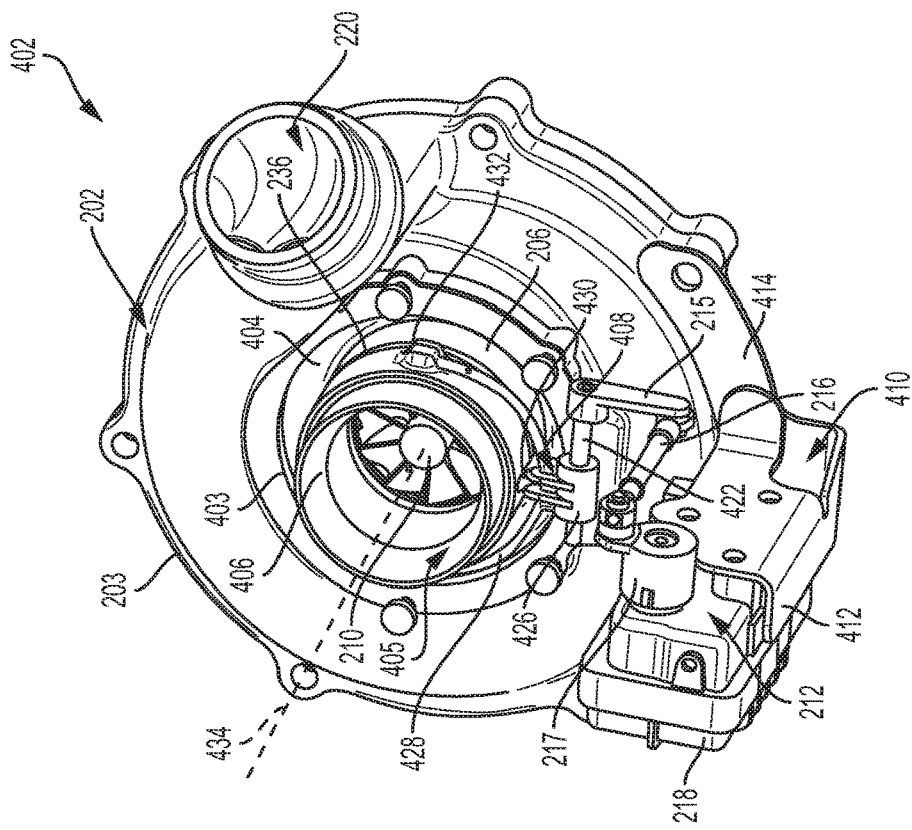
FIG. 4B shows a 3-D view of the actuator coupled to the first embodiment of the slidable sleeve enclosing the inner casing of the casing treatment of the compressor, with the inlet adapter removed.
Figure 4A:
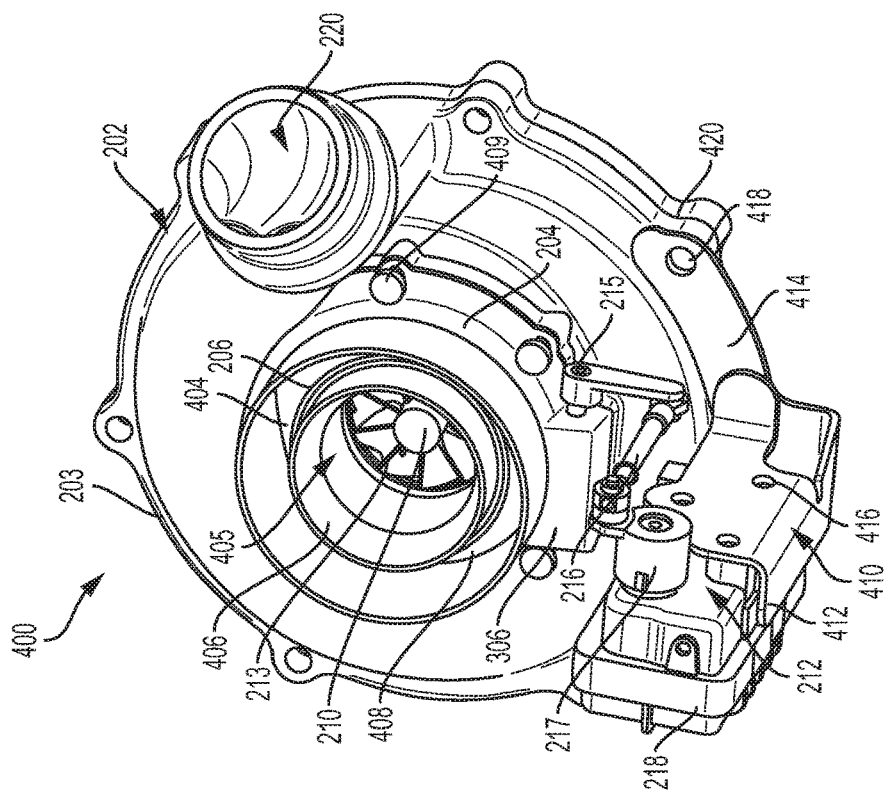
FIG. 4A shows a 3-D view of an actuator coupled to the first embodiment of the slidable sleeve enclosing an inner casing of a casing treatment of the compressor.
Figure 8:
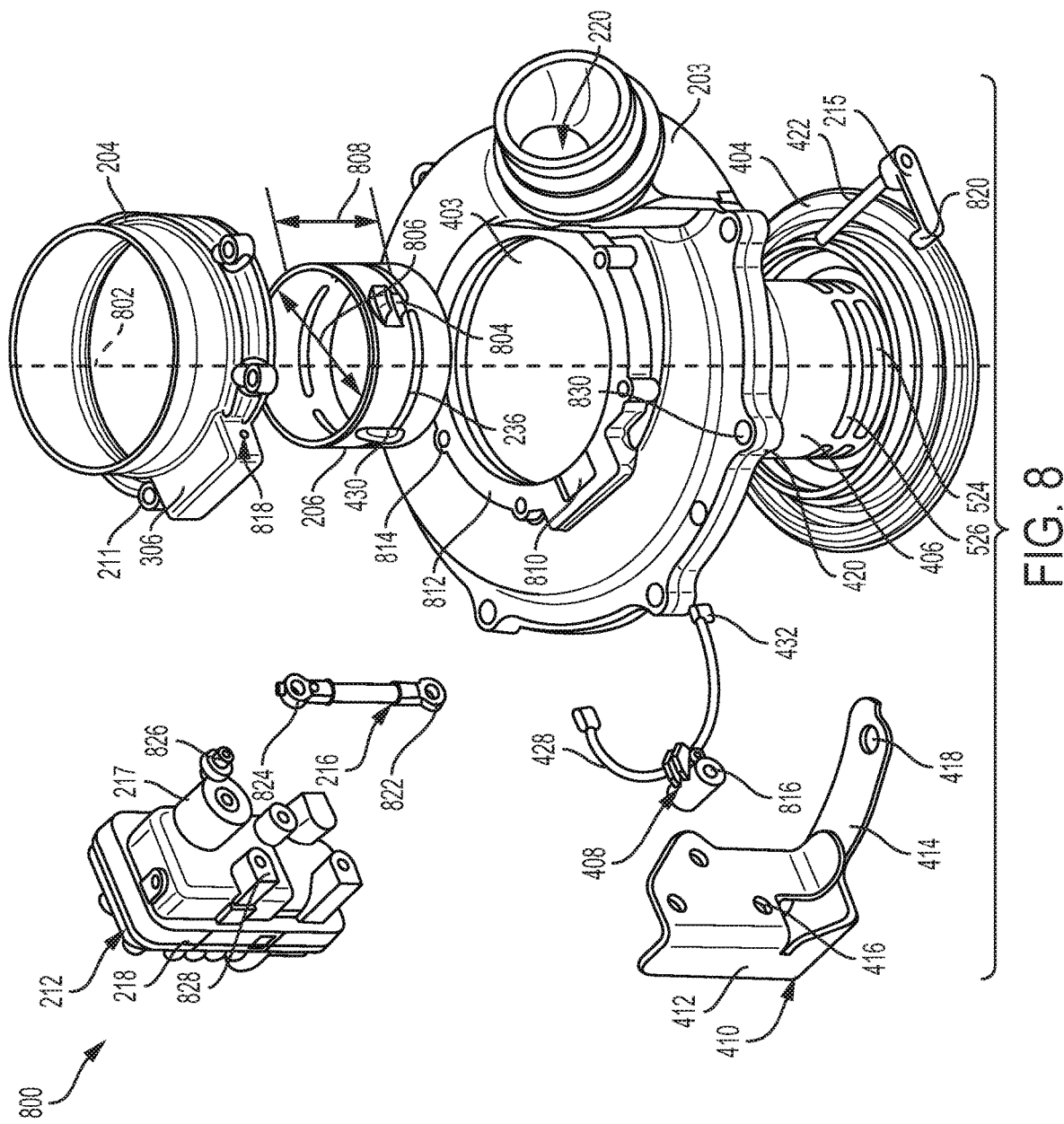
FIG. 8 shows an exploded view of the actuator and components of the turbocharger compressor.

FIG. 8 shows an exploded view of the turbocharger compressor depicted in FIG. 4A. The turbocharger compressor may include the compressor housing, inlet adapter, the first embodiment of the slidable sleeve, casing treatment and components of the actuator. The different components of the turbocharger compressor may be assembled together and coupled to an engine, such as the engine disclosed herein in FIG. 1.

The actuator may be coupled to a second embodiment of a slidable sleeve as disclosed herein with reference to FIGS. 6A and 6B. In this case, the slidable sleeve encloses an inner casing of an alternative embodiment of a casing treatment. An engine controller may control the actuator to move the slidable sleeve relative to the inner casing to change flow geometry of the compressor based on turbocharger conditions or engine operating conditions.

In FIG. 7A, a cross sectional view of a portion of the casing treatment with the second embodiment of the slidable sleeve adjusted to a first position is shown. When the slidable sleeve is adjusted to the first position, both the choke and surge slots on the inner casing are open. Also, additional air may be delivered to a compressor wheel disposed in the casing treatment via the choke and surge slots. The additional flow introduced to the compressor wheel, especially the flow through the choke slot can extend the choke flow capacity of the compressor. In this way, the slidable sleeve may be selectively adjusted to a position where both the choke and surge slots are open to direct more air into the compressor wheel to improve choke flow capacity. Since the surge slot is always open in the second embodiment of the slidable sleeve design, air flow entering the inner casing of the casing treatment via the compressor inlet may be recirculated via the surge slots when compressor operates near surge condition.

The second embodiment of the slidable sleeve may be adjusted to a second position relative to the inner casing of the casing treatment, as disclosed with reference to FIG. 7B. When the slidable sleeve is adjusted to the second position relative to the inner casing, the choke slots may be closed while the surge slots remain open. In this case, a portion of air entering the inner casing may be recirculated via the surge slots to extend the surge margin. In this way, the second embodiment of the slidable sleeve may be referred to herein as a two position sleeve design, where the slidable sleeve is adjustable between the first position and second position to improve choke flow capacity while providing a sufficient surge margin. The engine controller may control the actuator to actuate the slidable sleeve through a plurality of positions relative to the inner casing of the casing, as disclosed in FIG. 9. An example method for adjusting a position of the first embodiment of the slidable sleeve relative to the casing treatment of the compressor is disclosed in FIG. 9. In this case, the position of the slidable sleeve along the casing treatment may be adjusted based on engine operations to a first position, a second position and a third position. In the first position, the slidable sleeve is actuated relative to the casing treatment such that the sleeve slots on the slidable sleeve are aligned with the choke slots (e.g., choke slots are open) and not aligned with the surge slots (e.g., surge slots are closed) on the casing treatment. In the second position, the slidable sleeve is actuated relative to the casing treatment such that the sleeve slots on the slidable sleeve are not aligned with the choke slots (e.g., choke slots are closed) and the surge slots (e.g., surge slots are closed) on the casing treatment. In the third position, the slidable sleeve is moved relative to the casing treatment such that the sleeve slots on the slidable sleeve are not aligned with the choke slots (e.g., choke slots are closed) and are aligned with the surge slots (e.g., surge slots are open) on the casing treatment.

For example, when the compressor flow is greater than an upper threshold flow rate, the engine controller may control the actuator to selectively move the slidable sleeve, relative to the casing treatment, to the first position where the sleeve slots on the slidable sleeve align with the choke slots (e.g., choke slots are open) and are not aligned with the surge slots (e.g., surge slots are closed) on the casing treatment. In this case, additional air may be delivered to the compressor wheel in the casing treatment to extend choke flow conditions. Since, the surge slots are closed, no airflow is recirculated from the compressor wheel in the casing treatment back to the compressor inlet.

In another example, where the compressor flow is between a lower threshold flow rate and the upper threshold flow rate, the engine controller may control the actuator to move the slidable sleeve relative to the casing treatment, to the second position where the plurality of sleeve slots on the slidable sleeve do not align with the choke slots (e.g., choke slots are closed) and surge slots (e.g., surge slots are closed) on the casing treatment. Since, the choke slots are closed, no airflow reaches the compressor wheel in the casing treatment via the choke slots. When the surge slots are closed, no airflow is recirculated from the compressor wheel in the casing treatment back to the compressor inlet. In this case, the air entering the compressor is compressed by the compressor wheel and delivered to an air intake manifold where the air is further conveyed to one or more engine cylinders to mix with injected fuel prior to combustion.

In a further example, the compressor flow may be less than the lower threshold flow rate, and the engine controller may send control signals to the actuator unit of the actuator assembly to actuate the slidable sleeve along the casing treatment to the third position where the sleeve slots are aligned with the surge slots (e.g., surge slots are open) and the sleeve slots are not aligned with choke slots (e.g., choke slots closed). In this case, air may be recirculated from the compressor wheel in the casing treatment back to the compressor inlet via the surge slots to extend the surge margin. Since, the choke slots are closed, no airflow reaches the compressor wheel in the casing treatment via the choke slots.

Figure 9:
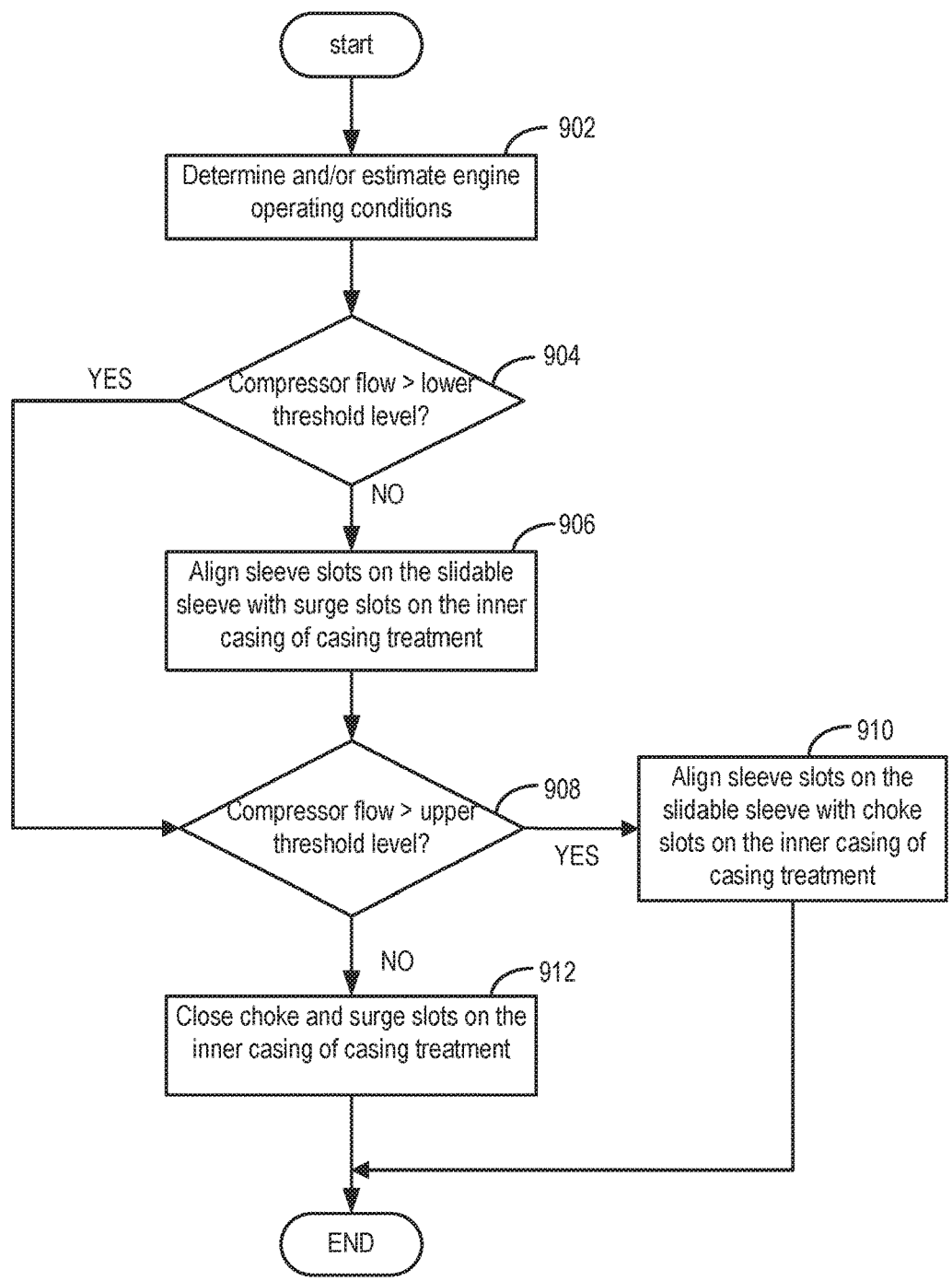
FIG. 9 shows an example method for adjusting the first embodiment of the slidable sleeve during engine operation.

The example method described in FIG. 9 may be adjusted to apply to the second embodiment of the slidable sleeve. In this case, a position of the second embodiment of the slidable sleeve along the casing treatment may be adjusted based on engine operations to a first position and a second position. In the first position, the slidable sleeve is actuated relative to the casing treatment such that the sleeve slots on the slidable sleeve are aligned with the choke slots (e.g., choke slots are open) and surge slots (e.g., surge slots are open) on the casing treatment. In the second position, the slidable sleeve is actuated relative to the casing treatment such that the sleeve slots on the slidable sleeve are not aligned with the choke slots (e.g., choke slots are closed) and the surge slots (e.g., surge slots are closed). When the second embodiment of the slidable sleeve is adjusted between the first and second position, the surge slots on the casing treatment may be always partially or fully open.

In this way, an engine controller may control the actuator assembly to selectively adjust the position of the slidable sleeve relative to the casing treatment, thereby changing the alignment of sleeve slots on the slidable sleeve relative to choke or surge slots on the casing treatment to accommodate a wide range of airflow conditions while increasing compressor efficiency.

Turning now to FIG. 1, a schematic view 100 of an example internal combustion engine 10 having a turbocharger is disclosed. Specifically, internal combustion engine 10 may comprise a plurality of cylinders, one cylinder of which is shown in FIG. 1. The internal combustion engine 10 may be controlled at least partially by a control system including controller 12 and by input from a vehicle operator 72 via an input device 70. In this example, input device 70 includes an accelerator pedal and a pedal position sensor 74 for generating a proportional pedal position signal PPS. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Intake manifold 44 is also shown having fuel injector 68 coupled thereto for delivering fuel in proportion to the pulse width of signal (FPW) from controller 12.

Controller 12 is shown in FIG. 1 as a microcomputer, including microprocessor 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 115; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Further, controller 12 may estimate a compression ratio of the engine based on measurements from a pressure transducer (not shown) positioned in the combustion chamber 30.

The controller 12 receives signals from the various sensors of FIG. 1 and employs the various actuators of FIG. 1 to adjust engine operation based on the received signals and instructions stored on a memory of the controller. Storage medium read-only memory 106 can be programmed with computer readable data representing instructions executable by processor 102 for performing the methods.

In a configuration known as high pressure EGR, exhaust gas is delivered to intake manifold 44 by EGR tube 125 communicating with exhaust manifold 48. EGR valve assembly 120 is located in EGR tube 125. Stated another way, exhaust gas travels from exhaust manifold 48 first through valve assembly 120, then to intake manifold 44. EGR valve assembly 120 can then be said to be located upstream of the intake manifold. There is also an optional EGR cooler 130 placed in EGR tube 125 to cool EGR before entering the intake manifold. Low pressure EGR may be used for recirculating exhaust gas from downstream of turbine 16 to upstream of compressor 14 via valve 141.

Pressure sensor 115 provides a measurement of manifold pressure (MAP) to controller 12. EGR valve assembly 120 has a valve position (not shown) for controlling a variable area restriction in EGR tube 125, which thereby controls EGR flow. EGR valve assembly 120 can either minimally restrict EGR flow through tube 125 or completely restrict EGR flow through tube 125, or operate to variably restrict EGR flow. Vacuum regulator 124 is coupled to EGR valve assembly 120. Vacuum regulator 124 receives actuation signal 126 from controller 12 for controlling valve position of EGR valve assembly 120. In one embodiment, EGR valve assembly is a vacuum actuated valve. However, any type of flow control valve may be used, such as, for example, an electrical solenoid powered valve or a stepper motor powered valve.

Turbocharger 13 has a turbine 16 coupled to exhaust manifold 48 and a compressor 14 coupled in the intake manifold 44 via an intercooler 132. Turbine 16 is coupled to compressor 14 via a drive shaft 15. Air at atmospheric pressure enters compressor 14 from passage 140. Exhaust gas flows from exhaust manifold 48, through turbine 16, and exits passage 142. In this manner, the exhaust-driven turbine supplies energy to the compressor to boost the pressure and flow of air into the engine. The boost pressure may be controlled by the rotational speed of turbine 16 which is at least partially controlled by the flow of exhaust gas through turbine 16.

The controller 12 receives signals from the various sensors of FIG. 1 and employs the various actuators of FIG. 1 to adjust engine operation based on the received signals and instructions stored on a memory of the controller. Upon receiving signals from various sensors, the engine controller may send control signals to the actuator to alter the position of the slidable sleeve along the inner casing. For example, an actuator may receive signals from the MAP sensor to increase airflow in the compressor based on changes in engine speed measured by a speed sensor. In one example, adjusting air flow conditions in the compressor 14 may include the controller sending a control signal to an actuator unit of an actuator assembly to adjust a position of the actuator assembly coupled to a slidable sleeve (having a plurality of sleeve slots) coupled around a casing treatment (having a plurality of choke and surge slots) to adjust the air flow conditions in the compressor, as disclosed further with reference to FIGS. 2A and 2B.

Referring to FIG. 2A, a three-dimensional view 200 of a turbocharger compressor 202 of an engine is disclosed. The compressor 202 may include an inlet adapter 204 coupled to a compressor housing 203 via fasteners 211, and a first embodiment of a slidable sleeve 206 surrounding a portion of a casing treatment 208 having an inner casing 207 that accommodates a portion of a compressor wheel 210. The slidable sleeve 206 may be coupled around the inner casing 207 of the casing treatment 208 such that the sleeve is adjustable relative to the inner casing. The compressor wheel 210 may be positioned inside the casing treatment 208 to compress incoming air that enters the compressor 202 via an inlet 205 that may be coupled to an air intake manifold (e.g., the intake manifold 44, shown in FIG. 1) of the engine. The compressed air exits the compressor 202 via an outlet 220 that may be coupled to the intake manifold, where the air is further conveyed to intake ports of one or more engine cylinders. A plurality of primary connection lines 224 and 226, and a plurality of secondary connection lines 228 may be used to convey coolant and lubrication fluid from the engine to the turbocharger. The compressor 202 may be mounted adjacent to an engine component 234.

The slidable sleeve 206 may include a plurality of sleeve slots (not shown in FIG. 2A) that may be aligned with either a plurality of choke slots (not shown in FIG. 2A) or a plurality of surge slots (not shown in FIG. 2A) formed on the inner casing 207 by adjusting the slidable sleeve 206 to a particular position, relative to the inner casing 207 of the casing treatment 208, via an actuator 212 controlled by an engine controller (such as controller 12, shown in FIG. 1) based on engine operating conditions.

When assembled, the actuator 212 may include a fork arm 214 which may connect to a lever arm 215 that may couple to a connector rod 216 that attaches to a rotatable element or cam 217 coupled to an actuator unit 218, the connections of the fork arm, lever arm, connector rod, and rotatable element or cam are shown in more detail in FIGS. 4A-6B. The lever arm 215 may include a shaft (not shown) that extends through an opening in the inlet adapter 204, and couples to the fork arm 214. The actuator unit 218 may contain electronic components used to control movement of the lever arm 215 and connector rod 216 to adjust the position of the slidable sleeve 206 relative to the inner casing 207 of the casing treatment 208. As an example, the actuator 212 may be an electric actuator coupled to the slidable sleeve 206 to adjust the position of the sleeve relative to the inner casing 207. In other examples, the actuator 212 may be a hydraulic or pneumatic actuator coupled to the slidable sleeve 206 to adjust the position of the sleeve relative to the inner casing 207. The actuator 212 may be controlled by an engine controller (such as controller 12 shown in FIG. 1) in response to turbocharger compressor conditions including speed and air flow rate, for example. In further examples, the actuator 212 may be controlled based on estimates of compressor conditions or engine operating conditions, such as engine speed, load and throttle position.

During engine operation, the controller may adjust the actuator 212 to move the slidable sleeve 206 to a particular position relative to the inner casing 207. For example, the actuator 212 may be controlled to move the slidable sleeve 206 to a first position where the sleeve slots are not aligned with either the choke or surge slots. In this case, the air entering the compressor 202 through the inlet 205 is compressed and delivered to the intake manifold without being recirculated through the compressor via the surge slots which are closed (e.g., blocked by a wall of the slidable sleeve) when the slidable sleeve 206 is adjusted to the first position. Since the choke slots are closed (e.g., blocked) when the sleeve is adjusted to the first position, no airflow reaches the compressor wheel 210 via the choke slots. The compressed air in the intake manifold is further conveyed to engine cylinders, where the air mixes with fuel prior to combustion.

In another example, the engine controller may control the actuator 212 to move the slidable sleeve 206 from the first position to a second position (where the plurality of sleeve slots are aligned with the plurality of choke slots and not aligned with the plurality of surge slots) based on engine operating conditions. In one example, the engine may be operating at high speeds and a high compressor flow may be required to deliver more air into the engine cylinders. In this case, additional air is delivered to the compressor wheel 210 (via the choke slots), where the air is compressed and delivered to the air intake manifold. The compressed air in the intake manifold is further conveyed to the engine cylinders to mix with injected fuel to produce an air-fuel mixture which combusts to produce engine power.

In a further example, the actuator 212 may be adjusted to move the slidable sleeve 206 from the first position (where the sleeve slots are not aligned with either the choke or surge slots) to a third position, where the sleeve slots are aligned with the surge slots and not aligned with choke slots on the inner casing 207 of the casing treatment 208. In this case, the engine may be operating at low engine speeds and low compressor flow may be required, for example. The air entering the compressor via the inlet 205 may be recirculated via the open surge slots to extend the surge margin. Since the surge slot is positioned adjacent to the compressor wheel inlet (e.g., impeller inlet) and a width of the surge slot is smaller compared to a width of the choke slot, the amount of recirculation flow through the surge slot may be reduced, which in turn reduces recirculation flow loss. In this way, compressor performance may be improved. In this way, the slidable sleeve 206 may be adjusted from one position relative to the inner casing 207 of the casing treatment 208 to another position along the inner casing 207 to modify air flow entering the compressor 202 and air flow delivered to engine cylinders while minimizing air flow leakage and improving turbocharger efficiency.

Referring to FIG. 2B, a cross sectional view 201 of the slidable sleeve 206 coupled around the casing treatment 208 of the compressor 202 of the turbocharger is disclosed. The compressor 202 includes the compressor housing 203 that is coupled to a compressor plate 240 to form an air passage 234. The casing treatment 208 may be positioned in a main passage (not shown) in the compressor housing 203 and secured to an inner portion of the compressor housing 203 via protruding elements 244 that snap into retention in recessed slots 246 in the compressor housing. The inlet adapter 204 may be coupled to an outer portion of the compressor housing 203 via a plurality of fasteners (such as fasteners 211 shown in FIG. 2A).

As shown in FIG. 2B, the compressor wheel 210 may be positioned within the inner casing 207 of the casing treatment 208 along a central axis 252. An inner wall 209 of the inner casing 207 forms an inlet passage that receives air entering the compressor and flowing to the compressor wheel. The casing treatment 208 may be accommodated in an interior portion of the compressor housing 203. The slidable sleeve 206 coupled around an outer surface of the inner casing 207 of the casing treatment 208 includes a plurality of sleeve slots 236 positioned around a circumference of the slidable sleeve 206. Although, shown as having the plurality of sleeve slots 236, the slidable sleeve 206 may have a single continuous slot around the circumference of the sleeve. The slidable sleeve 206 may be moved along the length of the inner casing 207, in a direction of central axis 252, to align the sleeve slots on the sleeve with a plurality of choke slots (e.g., first slots) 248 or surge slots (e.g., second slots) 250 (formed on a portion of the inner casing 207) based on engine operating conditions, such as engine speed and load, for example.

The choke slots 248 on the inner casing 207 are open when the choke slots are not blocked by the slidable sleeve 206 such that the sleeve slots 236 are aligned with the choke slots. Further, the choke slots 248 are closed when blocked by the slidable sleeve 206 such that the sleeve slots 236 are not aligned with the choke slots. Similarly, the surge slots 250 on the inner casing 207 are open when the surge slots are not blocked by the slidable sleeve 206 such that the sleeve slots 236 are aligned with the surge slots. Further, the surge slots 250 are closed when blocked by the slidable sleeve 206 such that the sleeve slots 236 are not aligned with the surge slots.

The choke slots 248 on the inner casing 207 may be positioned adjacent to a leading edge of a first blade 254 on the compressor wheel 210 and the surge slots 250 may be positioned adjacent to a leading edge of a second blade 256 on the compressor wheel 210, upstream of the choke slots 248, for example. In this example, the first blade 254 may be a splitter blade and the second blade 256 may be a full blade. In this case, the choke slots 248 on the inner casing 207 may be positioned adjacent to a plurality of splitter blades on the compressor wheel 210 and the surge slots 250 may be positioned adjacent to a plurality of full blades on the compressor wheel 210, the full blades positioned upstream of the splitter blades, relative to a direction of airflow into the compressor inlet. Both the choke slots 248 and surge slots 250 may be positioned closer to the outlet 255 and the compressor wheel 210 than the inlet 205 of the inner casing. For example, the choke slots 248 are positioned further downstream in the inner casing 207 than the surge slots 250, relative to a direction of airflow into the compressor and through the inner casing 207.

In another example, the choke slots 248 may be positioned in a range of 25-50% along a streamwise location of the compressor wheel 210 between the inlet 205 to an outlet 255 on the inner casing 207, and the surge slots may be positioned in a range of 5-15% along the streamwise location of the compressor wheel 210 between the inlet 205 to the outlet 255 on the inner casing 207. When the actuator (e.g., actuator 212 shown in FIGS. 4A-6B) is adjusted, motion of the lever arm 215 may translate the slidable sleeve 206 from one position relative to the inner casing 207 to another position along the inner casing 207 based on turbocharger conditions or engine operating conditions. When the engine tips out, low compressor flow may be required, for example. In this example, the engine controller (e.g., controller 12 shown in FIG. 1) may actuate the actuator to move the slidable sleeve 206 from a position, where the sleeve slots are not aligned with either the choke or surge slots, to the another position, where the sleeve slots are aligned with the surge slots and not aligned with the choke slots. In this case, the air entering the compressor 202 via the inlet 205 may be recirculated via the open surge slots to extend the surge margin.

The slidable sleeve 206 may be expeditiously moved from the position where both choke and surge slots are not aligned with the sleeve slots to the position where the sleeve slots are aligned with the surge slots, thereby allowing the compressor to quickly adjust airflow conditions based on changes in engine operating conditions. In the compressor disclosed herein, the position of the sleeve slots on the slidable sleeve 206 and the position of the choke and surge slots on the inner casing 207 may obviate the need to move the slidable sleeve 206 from an outlet end of the inner casing 207 to a position further from the compressor outlet to align either choke or surge slots.

In another example, the engine may be operating at high speeds, close to engine rated power. In this case, a high compressor flow may be required to deliver more air into the engine cylinders. In this example, the engine controller may control the actuator to actuate the slidable sleeve 206 to a position, where the sleeve slots 236 are aligned with the choke slots 248 and not aligned with the surge slots 250. In this case, additional air is delivered to the compressor wheel 210 via the choke slots 248. The air entering the compressor wheel 210 may be compressed and fed into the air intake manifold before being delivered to the engine cylinders. In this way, the engine controller may control the actuator to move the slidable sleeve 206 from one position relative to the inner casing 207 of the casing treatment 208 to another position (along the inner casing 207) to modify air flow entering and leaving the compressor wheel 210 while minimizing flow leakage and improving turbocharger efficiency.

Referring to FIGS. 3A and 3B, a three dimensional view 300 of the inlet adapter 204 and the first embodiment of the slidable sleeve 206 coupled to the casing treatment 208, and a three dimensional view 302 of the first embodiment of the slidable sleeve 206 coupled to the casing treatment 208 without the inlet adapter 204 is disclosed. The first embodiment of the slidable sleeve 206 may be referred to herein as a three position sleeve design corresponding to the first, second, and third positions of the slidable sleeve 206 relative to the inner casing 206. In the first position, the choke slots on the casing treatment 208 are open (e.g., not blocked by the slidable sleeve such that the sleeve slots are aligned with the choke slots) and surge slots on the casing treatment 208 are closed (e.g., blocked by the slidable sleeve such that the sleeve slots are not aligned with the surge slots), and in the second position, both the choke slots and surge slots are closed. In the third position, the choke slots are closed while the surge slots are open.

As shown in FIG. 3A, the inlet adapter 204 is secured to the casing treatment 208 via the plurality of fasteners 211 spaced uniformly or non-uniformly around a circumferential outer surface of the inlet adapter 204. For example, the fasteners 211 may be M6 or M8 fasteners inserted in slots (not shown) in the inlet adapter 204 to securely fasten the inlet adapter to the casing treatment 208. In other examples, the fasteners 211 may be bolt assemblies or other suitable type of fasteners used to secure the inlet adapter 204 to the casing treatment 208. An embodiment of the inlet adapter 204 includes a side portion 304 having an opening to receive a shaft (e.g., shaft 326 shown in FIG. 3B) coupled to the lever arm 215 of the actuator (e.g., actuator 212 shown in FIG. 2A) on one end of the lever arm 215, and coupled to a fork arm 214 on another end of the lever arm 215. An outer portion of the casing treatment 208 may include a plurality of circular rings 308 formed at different elevations and connected to each other to form a single integral component. The inner casing 207 of the casing treatment 208 extends outward (from the outer portion of the casing treatment 208), and further extends into an inner opening 306 in the inlet adapter 204. The inner casing 207 includes the plurality of choke slots (e.g. choke slots 248 shown in FIG. 2B) and surge slots (e.g., surge slots 250 shown in FIG. 2B) formed around a circumferential surface of the inner casing, each pair of choke slots and surge slots separated by a rib element 310. As an example, each rib element 310 separating each pair of choke and surge slots may provide structural rigidity to the inner casing 207 of the casing treatment 208. The slidable sleeve 206 may be positioned around an outer surface of the inner casing 207 of the casing treatment 208. In this case, both the slidable sleeve 206 and inner casing 207 may be positioned inside the opening 306 in the inlet adapter 204.

The position of the slidable sleeve 206 may be adjusted relative to the inner casing 207 by moving the lever arm 215 of the actuator which in turn moves the fork arm 214 coupled to the slidable sleeve 206. As an example, the slidable sleeve 206 may be moved to a first position where the sleeve slots are aligned with the choke slots and surge slots are closed. When the sleeve slots on the slidable sleeve 206 are aligned with the choke slots on the inner casing 207 (e.g., the chokes slots are open), air may enter the compressor via the choke slots to minimize or reduce choke conditions. In this example, the surge slots are not aligned with the sleeve slots (e.g., the surge slots are blocked by the slidable sleeve), and therefore no air is recirculated via the surge slots back into the compressor inlet 205.

In another example, the slidable sleeve 206 may be moved to a second position where the sleeve slots are not aligned with both the choke slots and surge slots. In this case, both the choke slots and surge slots are closed (e.g., the choke and surge slots are blocked by the slidable sleeve). Since the choke slots and surge slots are not aligned with the sleeve slots, no air is delivered to the compressor wheel 210 via the choke slots, and no air is recirculated back into the compressor inlet 205 via the surge slots. The air entering the compressor via the inlet 205 may be compressed by the compressor wheel 210 and delivered to the engine cylinders (via the intake manifold) to meet engine operating conditions.

Alternatively, the actuator may be controlled to actuate the slidable sleeve 206 to a third position where the sleeve slots are aligned with the surge slots (e.g., the surge slots are open) and the choke slots are closed (e.g., the choke slots are blocked by the slidable sleeve). In this case, a portion of the air flow is recirculated from the compressor wheel (e.g., compressor wheel 210 shown in FIG. 2B) back into the compressor inlet 205 to extend the surge margin. In this way, the actuator may be controlled to move the slidable sleeve 206 from one position relative to the inner casing 207 of the casing treatment 208 to another position along the inner casing 207 to accommodate a wide range of air flow conditions in the compressor while reducing air flow leakage and increasing turbocharger efficiency.

The inlet adapter (e.g., inlet adapter 204 shown in FIG. 3A) may be removed from the casing treatment 208 to show details of the sleeve slots 236 on the slidable sleeve 206, as shown in FIG. 3B. Each pair of sleeve slots 236 may be separated by a rib section 314 that provides structural rigidity to the slidable sleeve 206. Each sleeve slot 236 extends lengthwise around a circumference of the slidable sleeve 206. Further, each sleeve slot 236 may have a width along an axial direction parallel to a casing axis 340 (casing axis 340 is parallel to and may be referred to herein as a rotational axis of the compressor wheel and/or compressor).

As shown in FIG. 3B, the slidable sleeve 206 may enclose the inner casing 207 within an opening 318 formed by an annular portion 316 of the casing treatment 208 that is connected to the circular rings 308 of the casing treatment 208. A curved arm 320 of the fork arm 214 may be coupled to the slidable sleeve 206 at a plurality of joint interfaces on an outer surface of the slidable sleeve 206 via terminal ends 322 of the curved arm 320. As an example, the fork arm 214 may be a fixed or rigid component that does not rotate or pivot. The terminal (e.g., distal) ends 322 of the curved arm 320 are coupled along the slidable sleeve 206 at a location upstream from the sleeve slots 236, and further toward the inlet 205. The curved arm 320 couples to an annular section 324 of the fork arm 214 having an opening (not shown) that accommodates a shaft 326 of the lever arm 215 along a hinge axis 325. As an example, the annular section 324 of the fork arm 214 may directly couple to the shaft 326 via a hinge joint 328, which allows the lever arm 215 to rotate in a direction shown by double arrows 330. In this example, the fork arm 214 is directly coupled to the lever arm 215. When adjusted, the lever arm 215 may rotate through an angle 332 (defined between levers axes 334 and 336), the rotational motion of the lever arm 215 moving the slidable sleeve 206 either outward and away from the opening 318 or inward and toward the opening 318, as shown by double arrow 338. As an example, the rotational motion of the shift lever 215 is transferred to the curved arm 320 of the fork arm 214 (via shaft 326 at the hinge joint 328), the curved arm 320 then moves the slidable sleeve 206 outward and away from the opening 318, in a direction parallel to the casing axis 340.

The angle 332 may range from 0 to 90 degrees, for example. In one example, the angle 332 may be zero degrees when the lever arm 215 is adjusted to a horizontal position with the arm axis 336 parallel to lever arm 215. In another example, the angle 332 may be 90 degrees when the lever arm 215 is adjusted to a vertical position with the lever arm 215 positioned parallel to the arm axis 330 and perpendicular to the arm axis 336. The actuation system may be operated to provide a fast response when the slidable sleeve is adjusted to open or close the choke and surge slots in the casing treatment for fast compressor response to meet engine requirements. Further, the actuation system requires low torque during operation.

When adjusted along the inner casing 207, the slidable sleeve 206 may either move outward and away from the opening 318 or move inward and toward the opening 318 to vary alignment of the sleeve slots relative to the choke and surge slots. For example, the slidable sleeve 206 may be moved to a position where the sleeve slots 236 are aligned with the surge slots 250 while the choke slots are closed. In this case, air may be recirculated from the compressor wheel (e.g., compressor wheel 210 shown in FIG. 2B) back to the compressor inlet 205 via the open surge slots. In another example, the slidable sleeve 206 may be moved to a position where the sleeve slots 206 are aligned with the choke slots (e.g., the choke slots are open) and the surge slots are not in alignment with the sleeve slots (e.g., the surge slots are closed). In this case, additional air is delivered to the compressor wheel via the choke slots to reduce or minimize choke conditions. In this way, the actuator may be adjusted to move the slidable sleeve 206 from one position relative to the inner casing 207 of the casing treatment 208 to another position along the inner casing 207 to accommodate a wide range of air flow conditions in the turbocharger compressor to minimize flow leakage and increase turbocharger efficiency.

Referring to FIGS. 4A and 4B, a three dimensional view 400 of the compressor 202 and a three dimensional view 402 of the compressor 202 with the inlet adapter 204 removed, respectively, is disclosed. The compressor 202 may include an alternative embodiment of a casing treatment 404 having an inner casing 406 partially enclosed by the first embodiment of the slidable sleeve 206.

The compressor wheel 210 may be positioned inside the inner casing 406 of the casing treatment 404 to compress incoming air that enters the compressor 202 via an inlet 405 that may be coupled to an air intake manifold (such as the intake manifold 44 shown in FIG. 1) of the engine. The compressed air exits the compressor housing 203 via an outlet 220 that may be coupled to the air intake manifold, where the air is further conveyed to intake ports of one or more engine cylinders. An engine controller (e.g., controller 12 shown in FIG. 1) may control the actuator 212 to adjust the slidable sleeve 206 relative to the inner casing 406 to align either choke or surge slots on the inner casing or block both choke and surge slots depending on turbocharger conditions or engine operating conditions.

The actuator 212 may include a fork arm 408 coupled to the lever arm 215 via a shaft enclosed in the side portion 306 of the adapter 204. As an example, the fork arm 214 is directly coupled to the lever arm 215, thereby allowing motion from the lever arm 215 to be transferred to the fork arm 214 and slidable sleeve 206. The fork arm 214 may be a fixed or rigid component that does not rotate or pivot. The connector rod 216 couples to the lever arm 215 on one end and couples to the rotatable element or cam 217 connected to the actuator unit 218 on another end. As an example, the connector rod 216 is directly coupled to the lever arm 215 on one end, and directly coupled to the actuator unit 218 on another end. The actuator unit 218 of the actuator 212 receives a signal from the controller (e.g., controller 12 shown in FIG. 1) and then the actuator actuates the rotatable element or cam 217 which moves the connector rod 216 coupled to the lever arm 215. In this case, the rotatable element or cam 217 is directly coupled to the actuator unit 218. The motion of the connector rod 216 rotates the lever arm 215 which in turn moves the fork arm 408 and slidable sleeve 206 along the inner casing 406 of the casing treatment 404 to vary alignment of sleeve slots on the slidable sleeve 206 relative to choke and surge slots on the inner casing 406.

An attachment case 410 having an L-shaped portion 412 and a linear portion 414 may be secured to the actuator unit 218 and compressor housing 203. As an example, the L-shaped portion 412 may connect to the linear portion 414 to form a single integral case that secures the actuator unit 218 in place. The L-shaped portion 412 may include a plurality of slots 416 adapted to accommodate a plurality of fasteners (not shown) that may be used to secure the attachment case 410 to the actuator unit 218. The attachment case 410 may be further secured to the compressor housing 203 via a fastener (not shown) that may be inserted in an opening 418 in the linear portion 414 of the attachment case 410, and extended into an annular section 420 on the compressor housing.

As shown in FIG. 4B, the fork arm 408 connects to the lever arm 215 which is coupled to the connector rod 216 attached to the rotatable element 217 connected to the actuator unit 218 to form the actuator 212. The lever arm 215 may include a rigid connecting shaft 422 that extends through an opening (not shown) in an annular section 426 of the fork arm 408 that couples to a curved portion 428 of the fork arm 408. The curved portion 428 of the fork arm 408 may include a plurality of terminal tabs 432 that snap into retention in apertures (not shown) on an outer surface of the slidable sleeve 206. The actuator unit 218 of the actuator 212 may include electronic components used to control movement of the rotatable element 217 which in turn moves the connector rod 216, which translates in a direction parallel to a central axis 434. The movement of the connector rod 216 rotates the lever arm 215 which in turn moves the fork arm 408 and slidable sleeve 206 in an axial direction along the central axis 434. The slidable sleeve 206 moves along the inner casing 406 to vary the alignment of the sleeve slots 236 relative to the choke and surge slots on the inner casing.

The engine controller may actuate (e.g., via sending a control signal to actuator unit 218) the actuator 212 to move the slidable sleeve 206 (relative to the inner casing 406) to a position where the sleeve slots 236 are aligned with the choke slots and the surge slots are closed. As an example, the engine may be operating at high speeds and a high compressor flow may be required to deliver more air into the engine cylinders. In this case, additional air is delivered to the compressor wheel 210 via the choke slots. The compressor wheel compresses the air into an air intake manifold, where the air is conveyed to the engine cylinders to mix with injected fuel to produce an air-fuel mixture which combusts to produce engine power.

In another example, the slidable sleeve 206 may be adjusted (relative to the inner casing 406) to another position, where the sleeve slots 236 are aligned with the surge slots (e.g., surge slots are open) and the choke slots are not aligned with the sleeve slots (e.g., the choke slots are closed). In this example, the engine may be operating at low engine speeds close to the compressor surge margin. The air entering the compressor via the inlet 405 may be recirculated via the surge slots to extend the surge margin. In this way, the slidable sleeve 206 may be adjusted relative to the inner casing 406 of the casing treatment 404 to accommodate a wide range of air flow conditions while minimizing flow leakage to improve turbocharger efficiency.

Figure 5B:
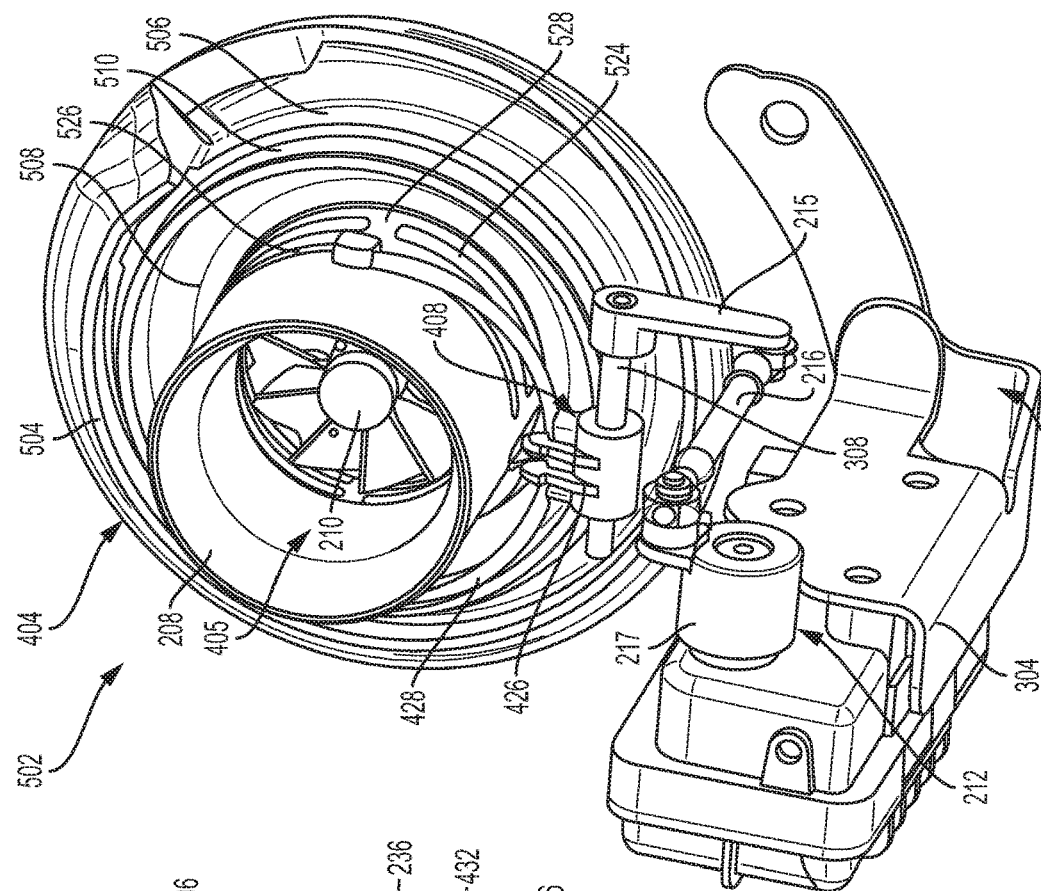
FIG. 5B shows a 3-D view of the actuator, and the inner casing of the casing treatment, with the slidable sleeve removed.
Figure 5A:
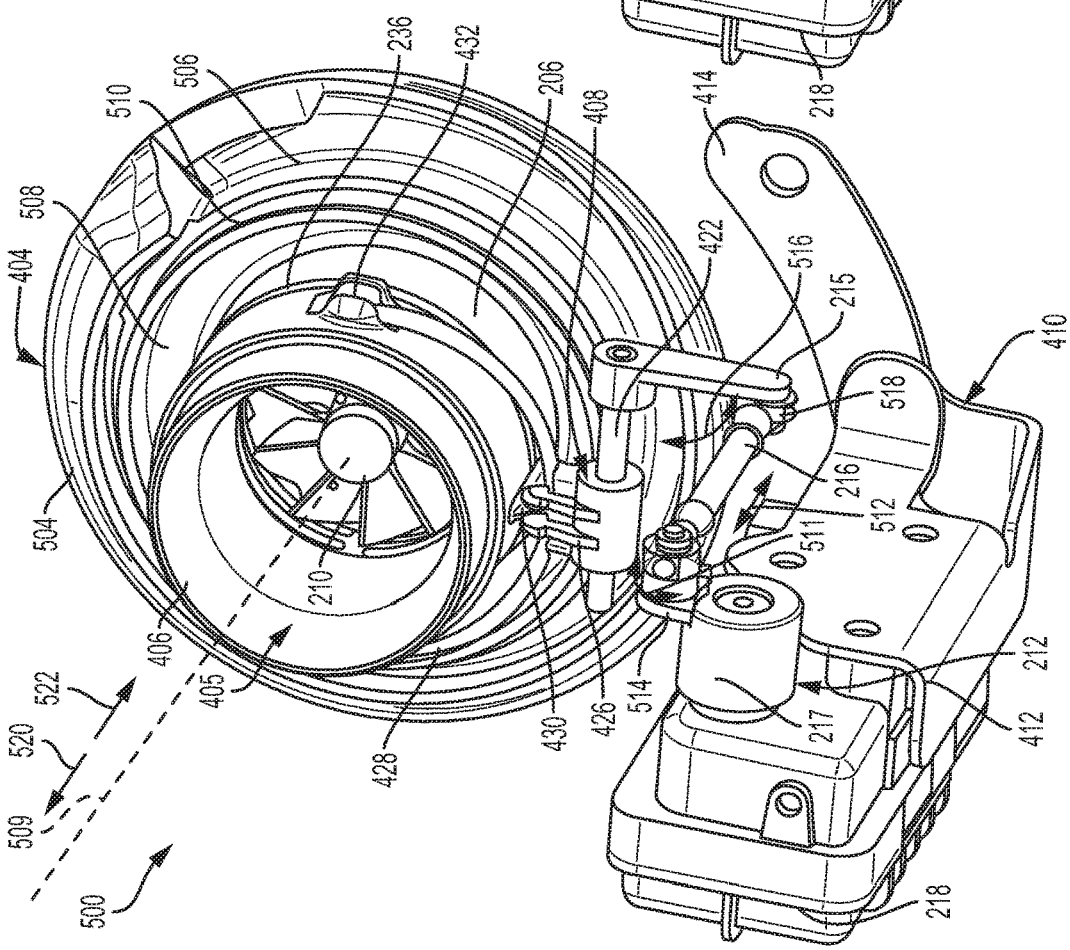
FIG. 5A shows a 3-D view of the actuator coupled to the first embodiment of the slidable sleeve enclosing the inner casing of the casing treatment.

Referring to FIGS. 5A and 5B, a three dimensional view 500 of the casing treatment 404 and the first embodiment of the slidable sleeve 206 coupled the actuator 212, and a three dimensional view 502 of the actuator 212 and casing treatment 404 with the first embodiment of the slidable sleeve 206 removed, respectively, is disclosed.

As shown in FIG. 5A, the casing treatment 404 may include an outer portion 504 and a circular ring 506 that forms an inner region 508 between the inner casing 406 and outer portion 504. The inner region 508 may accommodate a circular insert 510 placed between the circular ring 506 and the inner casing 406 of the casing treatment 404. The slidable sleeve 206 partially encloses the inner casing 406 and may be adapted to slide relative to the inner casing 406 in a direction parallel to a casing axis 509. As an example, the slidable sleeve 206 may include a first end (e.g., outlet end 513) positioned closer to an interior portion of the casing treatment 404 and the compressor wheel 210 than a second end (e.g., inlet 405) of the slidable sleeve, wherein the plurality of sleeve slots 236 are positioned closer to the first end than the second end, and wherein the fork arm 408 is coupled to the slidable sleeve at a position that is closer to the second end than the plurality of sleeve slots.

The engine controller may control the actuator 212 to adjust a position of the slidable sleeve relative to the inner casing 406 based on turbocharger conditions or engine operating conditions. Upon receiving a signal from the controller to adjust a position of the slidable sleeve, the actuator 212 may actuate the rotatable element or cam 217 in a direction shown by double arrow 511, thereby causing movement of the connector rod 216 in a direction as shown by double arrows 512. The motion of the connector rod 216 is transferred to the lever arm 215 which rotates in a direction shown by double arrows 516, thereby moving the fork arm 408 and the slidable sleeve 206 in an axial direction parallel to the casing axis 509. When the rotatable element or cam 217 is moved, a first pivot joint 514 (formed between the rotatable element or cam 217 and connector rod 216) transmits a pushing force along the connector rod 216 which allows the lever arm 215 to rotate about a second pivot joint 518. In this case, the rotatable element or cam 217 may urge the connector rod 216 inward and toward the extended portion 414 of the attachment case 410, the motion of the connector rod 216 causing the lever arm 215 to rotate about the second pivot joint 518. The rotational motion of the lever arm 215 then moves the fork arm 408 and slidable sleeve 206 outward and away from the compressor wheel, as shown by arrow 520. In this example, the connector rod 216 may move in a first axial direction parallel but opposite to the direction of movement (e.g., direction shown by arrow 520) of the forked arm 408 and slidable sleeve 206.

In an alternative example, the first pivot joint 514 may transmit a lifting force along the connector rod 216 which allows the lever arm 215 to rotate about the second pivot joint 518. In this case, the rotatable element or cam 217 may urge the connector rod 216 outward and away from the extended portion 414 of the attachment case 410, the motion of the connector rod 216 causing the lever arm 215 to rotate about the second pivot joint 518. The rotational motion of the lever arm 215 then moves the fork arm 408 and slidable sleeve 206 inward and toward the compressor wheel 210, as shown by arrow 522. In this example, the connector rod 216 may move in a second axial direction parallel but opposite to the direction of movement (e.g., direction shown by arrow 522) of the forked arm 408 and slidable sleeve 206. In this way, the actuation system may provide for a faster means of adjusting the slidable sleeve relative to the casing treatment, thereby providing a fast response of the compressor while operating at low torque requirement. Further, the slidable sleeve design is a compact system that may be easily packaged in the engine.

In this way, an engine controller may control the actuator assembly 212 to transfer linear motion, in an axial direction, with respect to a rotational axis (such as axis 509) of the compressor, to the fork arm 408 positioned around and coupled to the slidable sleeve 206, to move the slidable sleeve 206 in the axial direction along an outside of the inner casing 406 of the casing treatment 404 of the compressor to cover and uncover slots (e.g., choke and surge slots) in the inner casing 406. As an example, transferring linear motion to the slidable sleeve 206 may include rotating the rotatable element 217 directly coupled to a first end (e.g., first pivot joint 514) of the connector rod 217 to translate the connector rod in the axial direction (parallel to the direction shown by double arrows 512), where a second end (e.g., second pivot joint 518) of the connector rod 216 is directly coupled to a first end of a lever arm 215, such as a portion of the lever arm 215 adjacent to the second pivot joint 518.

In a further example, transferring linear motion to the slidable sleeve 206 may further include pivoting the lever arm 215 via the translation of the connector rod 216 in the axial direction to translate the rigid connecting shaft 422 coupled to the fork arm 408 linearly, in the axial direction. In yet another example, transferring linear motion to the slidable sleeve 206 may include translating the connector rod 216 in a positive axial direction (such as the direction shown by arrow 522), toward the compressor wheel 210 of the compressor, to transfer linear motion to the slidable sleeve 206 and translate the slidable sleeve 206 in a negative axial direction (such as the direction shown by arrow 520), away from the compressor wheel 210.

In other examples, the actuator unit 218 is adapted to translate the connector rod 216, in an axial direction (such as direction shown by double arrows 512) via rotation of the rotatatable element 217, wherein the connector rod 216 is adapted to rotate the lever arm 215 and rigid connecting shaft 422, and wherein the rigid connecting shaft 422 is adapted to translate the fork arm 408 and slidable sleeve 206 in a direction parallel to the axial direction. In this way, the actuator 212 may be adjusted to move the slidable sleeve 206 through a plurality of positions along the inner casing 406 of the casing treatment 404.

As shown in FIG. 5B, the inner casing 406 of the casing treatment 404 includes a plurality of choke slots 524 and a plurality of surge slots 526. Each pair of choke slots 524 and surge slots 526 may be separated by a rib section 528 that provides structural rigidity to the inner casing 406 of the casing treatment 404. As an example, the choke slots 524 may be positioned at a range of 25-50% along a streamwise location of the compressor wheel between the inlet 405 to an outlet on the inner casing 406 of the casing treatment 404, and the surge slot 526 may be positioned at a range of 5-15% along the streamwise location of the compressor wheel between the inlet 405 to the outlet on the inner casing 406 of the casing treatment 404. The first embodiment of the slidable sleeve 206 may be referred to herein as a three position sleeve design corresponding to the first, second and third positions of the sleeve relative to the inner casing 406 of the casing treatment 404. In the first position, the choke slots 524 are open and surge slots 526 are closed, and in the second position, the both the choke slots 524 and surge slots 526 are closed. In the third position, the choke slots 524 are closed while the surge slots 526 are open.

During engine operation, the slidable sleeve 206 may be adjusted relative to the inner casing 406 via the actuator 212 to accommodate changes in engine speed and load, for example. In one example, the engine may be operating at high speeds and the slidable sleeve 206 may be moved to a position where the sleeve slots are aligned with the choke slots 524 and surge slot 526 is closed. In this case, additional airflow may be delivered to the compressor wheel 210 via the choke slots 524 to extend compressor choke flow capacity.

In an alternative example, the engine may be operating at low speeds and the slidable sleeve 206 may be moved to another position where the sleeve slot 206 may be aligned with the surge slots 526 and the choke slots 524 are closed. In this example, air is recirculated from the compressor wheel back to the compressor inlet 405 via the surge slots 526 to extend the surge margin. In this way, the engine controller may control the actuator 212 to adjust the slidable sleeve 206 through a plurality of positions relative to the inner casing 406 to accommodate a wide range of air flow conditions while improving turbocharger efficiency.

Referring to FIGS. 6A and 6B, a three dimensional view 600 of the actuator 212 coupled to a second embodiment of a slidable sleeve 620, and an alternative three dimensional view 602 of the actuator 212 coupled to the second embodiment of the slidable sleeve 620, respectively, is disclosed. In each case, the slidable sleeve 620 encloses (e.g., circumferentially surrounds) an inner casing 606 of an alternative embodiment of a casing treatment 604. An engine controller may control the actuator 212 to move the slidable sleeve 620 relative to the inner casing 606 to change flow geometry of the compressor based on turbocharger or engine operating conditions. The casing treatment 604 may include an outer section 608, a circular ring 610 that forms an aperture 612 that accommodates a circular insert 614. The outer section 608 may include one or more bracing elements 616 that extended to the circular insert 614. The inner casing 606 may connect to an outer portion of the casing treatment 604, formed by the outer section 608 and circular ring 610. As an example, the inner casing 606 may extend outward and away from the bottom portion of the casing treatment 604. The inner casing 608 may further include a plurality of choke slots 617 and a plurality of choke slots 618, each choke slot 617 and surge slot 618 formed along a circumferential surface of the inner casing 606, as shown in FIG. 6A. As an example, each surge slot 618 may be formed closer to an inlet 605 of the inner casing 606 than each choke slot 617 on the inner casing 606.

The slidable sleeve 620, positioned around an outer surface of the inner casing 606, may include a plurality of openings 624, each opening 624 formed between a pair of extended sections 626 and a solid ring 621. Specifically, the solid ring 621 extends around an entire circumference of the slidable sleeve 620 and is positioned adjacent to the openings. The extended sections 626 extend outward from one side of the solid ring 621. The solid ring 621 is formed on a first side of the slidable sleeve and the openings are formed on a second side of the slidable sleeve. In this sleeve design, the slidable sleeve 620 has no sleeve slots, but has openings 624 which may align with the choke slots 617 or surge slots 618 on the inner casing 606 when the sleeve is moved to a first position, and the solid ring 621 may fully block the choke slot when the sleeve is moved to a second position. Each opening 624 may have a width 628 and a length 630. The width of each opening 624 is greater than a width of the choke slots and greater than a width of the surge slots (e.g., at least three times greater). For example the width of each opening 624 may be greater than a distance spanning the width of both the choke slots and surge slots. In one example, the width 628 of each opening 624 may range from 5 mm to 25 mm and a length 630 of each opening 624 may range from 25 mm to 35 mm. In another example, each opening 624 may have a rectangular shape with three closed ends and a single open end. As shown in FIG. 6B, the slidable sleeve 620 may have an inner diameter 632 larger than an outer diameter 634 of the inner casing 606. As an example, the inner diameter 632 of the slidable sleeve 620 may range from 50 mm to 70 mm, and the outer diameter 634 of the inner casing 606 may range from 40 mm to 65 mm.

The actuator 212 may be coupled to the slidable sleeve 620 via terminal tabs 432 on the curved portion 428 which snap into retention in apertures 636 in the extended sections 626 of the slidable sleeve 620. Further, the grip elements 638 on forked arm 408 may be attached to a protruding element 640 on the slidable sleeve 620, thereby providing additional means of securing the fork arm 408 to the slidable sleeve. The forked arm 408 is coupled to the lever arm 215 via the rigid connecting shaft 422 that extends through an opening in the fork arm 408. The connector rod 216 is coupled to the rotatable element 217 at the first pivot joint 514 and coupled to the lever arm 215 at the second pivot joint 518.

When the actuator 212 is actuated, the rotatable element 217 transfers the motion to the connector rod 216 via the first pivot joint 514, causing the connector rod 216 to move in a direction shown by arrow 642. Motion of the connector rod 216 is transferred to the lever arm 215 which rotates about the second pivot joint 518, in a direction shown by arrow 644. The rotational motion of the lever arm 215 moves the fork arm 408 and slidable sleeve 620 outward and toward the inlet 605, as shown by direction arrow 622. In one example, the slidable sleeve 620 may move (outward and away from the circular insert) to a first position where the choke slots 617 on the inner casing align with the openings 624 on the slidable sleeve, thereby allowing airflow into a compressor wheel (e.g., compressor wheel 210 shown in FIG. 2A) to extend choke flow capacity. In this example, the surge slots 618 may remain open to recirculate air back to the compressor inlet 605.

In another example, the actuator 212 may be adjusted based on engine operating conditions, such that movement of the lever arm 215 and connector rod 216, allows the fork arm 408 and slidable sleeve 620 to move inward and away from the inlet 605, thereby closing the choke slot 617 on the inner casing 606. The solid ring 621 of the slidable sleeve 620 blocks the choke slots, thereby closing the choke slots to prevent airflow into the compressor wheel via the choke slots. The surge slot 618 may always remain open when the slidable sleeve 620 is adjusted from one position to another position during engine operation. In this way, the second embodiment of the slidable sleeve 620 may be referred to herein as a two position sleeve design, where the slidable sleeve is adjustable between the first position and second position. When slidable sleeve 620 is adjusted to the first position, the choke slots on the inner casing 606 may be aligned with the openings on the slidable sleeve, and thus both choke and surge slots are open. When slidable sleeve 620 is adjusted to the second position, the choke slots 617 on the inner casing 606 may not be aligned with the openings 624 on the slidable sleeve 620 but the surge slots 618 may be aligned with the openings 624, the degree of alignment adjustable based on turbocharger conditions or engine operating conditions. In this case, the choke slots 618 are closed but the surge slots may remain open.

When the engine is operating at low speeds, the slidable sleeve 620 may be adjusted to one position where the openings 624 on the slidable sleeve 620 may be aligned with the surge slots 618 but the choke slots 617 are not aligned with the openings 624. In this case, air recirculated from the compressor wheel back to the compressor inlet via the open surge slots 618 (while the choke slots are closed) to extend the surge margin.

In an alternative example, when the engine is operating at high engine speeds, the slidable sleeve 620 may be moved to another position where the openings 624 on the slidable sleeve 620 may be aligned with both the choke slots 617 and surge slots 618. In this example, additional air is delivered to the compressor wheel via the choke slots, where the air is compressed and delivered to the air intake manifold. The compressed air in the intake manifold is further delivered to the engine cylinders to mix with injected fuel to produce an air-fuel mixture which combusts to produce engine power. Since, the surge slots 618 are open, a portion of the airflow may be recirculated from the compressor wheel back to the compressor inlet.

The position of the slidable sleeve 620 may be adjusted relative to the inner casing 606 such that the solid ring 621 fully blocks the choke slots 617 (e.g., choke slots are closed) and partially blocks the surge slots 617 (e.g., the surge slots are partially open). The degree of opening of the surge slots may be adjusted by varying the portion of solid ring 621 (relative to the inner casing 606) that covers or blocks the surge slots. As an example, the degree of opening of the surge slots may be varied to control amount of air recirculated back to the compressor inlet. By opening the choke slots 617 on the casing treatment 604, choke flow capacity may be extended. As the surge slot 618 is always open, surge margin can be extended. Further, the actuation control system is simplified since the slidable sleeve is adjusted to control the alignment of choke slots on the casing treatment with openings on the sleeve. In this way, the engine controller may control the actuator 212 to adjust the slidable sleeve 620 through a plurality of positions relative to the inner casing 606 to accommodate a wide range of air flow conditions while improving turbocharger efficiency.

Referring to FIG. 7A, a cross sectional view 700 of a portion of the casing treatment 604 with the second embodiment of the slidable sleeve 620 adjusted to a first position, is disclosed. When the slidable sleeve 620 is adjusted to the first position, the choke slots 617 and surge slots 618 on the inner casing 606 are open. Each pair of adjacent choke slots 617 and pair of adjacent surge slots 618 may be separated by a rib section 714 that extends in a direction parallel to the casing axis 704. A dividing rib 716 separates adjacent pairs of choke and surge slots by forming a boundary between each adjacent pair of choke and surge slots. The slidable sleeve 620 coupled to an outer surface 705 of the inner casing 606, may be adjusted relative to the inner casing 606 in a direction parallel to the casing axis 704. The solid ring 621 of the slidable sleeve 620 may be positioned relative to the choke slots 617 and surge slots 618 (e.g., the solid ring 621 is positioned between the choke and surge slots), such that the choke and surge slots are both open. The choke slots 617 may be referred to herein as first slots and the surge slots 618 may be referred to herein as second slots.

When coupled to and around the inner casing 606, the slidable sleeve 620 may be in face-sharing contact with the outer surface 705 of the inner casing 606 along a contact interface 706. The actuator (e.g., actuator 212 shown in FIGS. 6A and 6B) may be actuated by the engine controller to move the fork arm 408 outward and toward the compressor inlet 605 (as shown by arrow 708), which in turn moves the slidable sleeve 620 (coupled to the curved portion 428 of the fork arm 408) toward the compressor inlet along the inner casing 606 to the first position where the choke slots 617 and surge slots 618 are open. In this case, air flow entering the inner casing 606 via the inlet 605 may be recirculated via the surge slots 618, as shown by arrow 712. Also, additional air may be delivered to a compressor wheel (e.g., compressor wheel 210 shown in FIG. 2B) via the choke slots, as shown by arrow 710. In this case, the additional flow introduced to the compressor wheel disposed inside the inner casing 606 may extend the choke flow capacity of the compressor. In this way, the slidable sleeve 606 may be adjusted to a position where both the choke and surge slots are open to direct more air into the compressor wheel to improve choke flow capacity while providing a sufficient surge margin. When both choke and surge slots are open, air maybe still introduced from the inlet to the inner casing (e.g., impeller passage) to extend compressor choke flow. In this case the actuation system only needs to control the alignment of the choke slots and thereby simplifying the control system.

Referring to FIG. 7B, a cross sectional view 702 of a portion of the casing treatment 604 coupled to the second embodiment of the slidable sleeve 620 adjusted to a second position, is disclosed. The slidable sleeve 620 is adjusted from the first position to the second position, by moving the slidable sleeve 620 inward and away from the compressor inlet 605 along the inner casing 606, as shown by arrow 718. The second embodiment of the slidable sleeve 620 may be referred to herein as a two position sleeve design corresponding to the first and second positions of the sleeve. In the first position, both the choke slots 617 and surge slots 618 are open, and in the second position, the choke slots 617 are closed while the surge slots 618 may always remain open. When the slidable sleeve 620 is adjusted to the second position, the solid ring 621 of the slidable sleeve 620 blocks the choke slots 617 (e.g., choke slots 617 are closed) and does not block surge slots 618. In this case, the openings 624 in the slidable sleeve 620 are aligned with the surge slots 618 (e.g., surge slots are open).

Each choke slot 617 may have a length 720 and a width 722, and each surge slot 618 may have a length 724 and a width 726. As an example, the radius of 720 of choke slot may range from 25 mm to 40 mm and the width 722 of the choke slot 617 may range from 4 mm to 8 mm. The radius 724 of each surge slot 618 may range from 23 mm to 35 mm and the width 726 of each surge slot 618 may range from 1.0 mm to 3 mm. Each width of the choke and surge slots may be smaller than a width of the sleeve slots on the slidable sleeve. In other examples, each width of the choke and surge slots may be equal to a width of sleeve slots on the slidable sleeve. In further examples, the choke slots 617 and surge slots 618 may have a rectangular or elongated shapes. In further examples, the choke slots 617 and surge slots 618 may have circular or elliptical shapes. In this way, the choke slots 617 and surge slots 618 may have a range of sizes and shapes to accommodate a wide range of air flow conditions in the turbocharger compressor.

The engine controller may control the actuator to move the slidable sleeve 620 relative to the slidable sleeve 620 based on turbocharger conditions or engine operating conditions. When the actuator is adjusted, the fork arm 408 may move inward and away from the compressor inlet (as shown by arrow 718), thereby moving the slidable sleeve 620 (coupled to the curved portion 428 of the fork arm 408) away from the compressor inlet relative to the inner casing 606 to the second position where the choke slots 617 are closed but the surge slots 618 are open. In this case, a portion of the air flow entering the inner casing 606 via the inlet 605 may be recirculated via each of the surge slots 618, as shown by flow arrows 712 to extend the surge margin. In this way, the slidable sleeve 606 may be adjusted to a position where the choke slots 617 are closed and a portion of the airflow is recirculated back to the compressor inlet 605 via the open surge slots 618 to extend the surge margin.

Referring to FIG. 8, an exploded view 800 of the turbocharger compressor depicted in FIG. 4A, is disclosed. The turbocharger compressor may include the compressor housing 203, inlet adapter 204, the first embodiment of the slidable sleeve 206, casing treatment 404 and components of the actuator 212. The components of the actuator 212 may include the lever arm 215, connector rod 216, rotatable element 217, actuator unit 218 and attachment case 410. The turbocharger compressor may further include a central axis 802.

The slidable sleeve 206 may be axially extended through the opening 403 in the compressor housing 202 and then coupled to the inner casing 406 of the casing treatment 404. The inner casing 406 may enclose a compressor wheel (e.g., compressor wheel 210 shown in FIG. 4A) operated by a shaft (e.g., shaft 15 shown in FIG. 1) coupled to an exhaust driven turbine (e.g., turbine 14 shown in FIG. 1). When the slidable sleeve 206 is coupled to the inner casing 406 of the casing treatment 404, the plurality of sleeve slots 236 on the slidable sleeve 206 may be positioned adjacent to the plurality of choke slots 524 and surge slots 526 on the inner casing 406. When coupled around the inner casing 406, the slidable sleeve 206 may be moved along the inner casing 406 in a direction of axis 802. The slidable sleeve 206 may be movable between different positions relative to the inner casing 406 (in a direction along the axis 802), to vary alignment of the sleeve slots 236 relative to the choke slots 524 and surge slots 526. The slidable sleeve 206 may have a diameter 806 and a length 808. As an example, the diameter 806 of the slidable sleeve 206 may range from 40 mm to 80 mm and the length 808 may range from 30 mm to 60 mm. The fork arm 408 may be attached to the slidable sleeve 206 by inserting each terminal end 432 of the fork arm 408 into each aperture 804 formed on a circumferential surface of the slidable sleeve 206.

Next, the compressor housing 202 may be extended towards the casing treatment 404 to enclose the slidable sleeve 206 and the rest of the casing treatment 404. The inlet adapter 204 may be extended towards the compressor housing 202, such that the side portion 306 makes face contact with an extended section 810 of an outer surface 812 surrounding the main opening 403, and each fastener 211 on the adapter may be aligned with each slot 814 on the outer surface 812. Each fastener 211 may be extended into each slot 814 to secure the inlet adapter 204 to the compressor housing 202. When the inlet adapter 204 is coupled to the compressor housing 202, the side portion 306 of the inlet adapter 204 may accommodate the annular portion 426 of the fork arm 408, and an inner slot 814 on the annular portion 426 may be aligned with a slot 816 formed on the side portion 306.

The rigid connecting shaft 422 of the lever arm 215 may be extended into the slot 816 in the side portion 306, and extended further into the inner slot 812 on the annular portion 426 of the fork arm 408 enclosed within the side portion 306 of the inlet adapter 204. Next, a terminal end 820 of the lever arm 215 may be attached to a first end 822 of the connector rod 216, and then a second end 824 of the connector rod 216 may be attached to a side arm 826 of the rotatable element 217 coupled to the actuator unit 218. In this way, one end of the fork arm 408 may be coupled be to the slidable sleeve 206, and another end of the fork arm 408 may be coupled to the lever arm 215 which in turn may be coupled to the connector rod 216 connected to the actuator unit 218 via the annular portion to form the actuator 212.

The attachment case 410 may be extended towards the actuator unit 218 such that a plurality of apertures 828 on the actuator unit 218 are aligned with the slots 416 on the attachment case. A plurality of fasteners (not shown) may be extended through each slot 416 on the attachment case 410 and further extended into each aperture 828 on the actuator unit 218 to secure the actuator unit 218 to the attachment case 410. The attachment case 410 may be secured to the compressor housing 202 by extending a fastener or bolt (not shown) through the slot 418 aligned with an opening 830 in the annular section 420 of the compressor housing 202.

During engine operation, the engine controller may actuate the actuator 212 to move the slidable sleeve 206 (relative to the inner casing 406 of the casing treatment 404) to accommodate changes in engine speed and load. For example, when the engine is operating at medium speeds, the slidable sleeve 206 may be moved to a position where the sleeve slots 236 are not aligned with either choke slots 524 or surge slots 526. In this case, all the air entering the compressor is compressed via rotational of the compressor wheel, before being conveyed to the intake manifold via the outlet 220. The air in the intake manifold is delivered to one or more engine cylinders to mix with injected fuel to form an air-fuel mixture which is combusted to produce engine power. In another example, the engine controller may adjust the actuator 212 to move the slidable sleeve 206 from another position where the sleeve slots 236 are aligned with the choke slots 524 on the inner casing 406. In this case, additional air is delivered to the compressor wheel 210 via the choke slots 524 to extend choke flow capacity. In an alternative example, the slidable sleeve 206 may be moved to another position relative to the inner casing 406, different from the previous position, where the sleeve slots 206 may be aligned with the surge slots 526 on the inner casing 406. In this example, a portion of the air entering the compressor is recirculated back to the compressor inlet to extend the surge margin.

In this way, the actuator 212 may be actuated to move the slidable sleeve 206 through a plurality of positions relative to the inner casing 406 of the casing treatment 404 to accommodate a wide range of air flow conditions while reducing flow leakage and improving turbocharger efficiency.

Referring to FIG. 9, an example method 900 for adjusting a slidable sleeve of a turbocharger compressor based on turbocharger conditions or engine operating conditions is disclosed. Instructions for carrying out method 900 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 902, the method 900 includes determining or estimating engine operating conditions. As an example, the engine operating conditions may include engine speed, load, manifold absolute pressure, throttle position, air flow rate, exhaust flow rate etc. The manifold absolute pressure may be used to infer compressor performance including speed of compressor wheel and compressor flow rates. The engine speed and exhaust flow rates may be used to estimate turbine speed, for example. The turbine speed may be used in conjunction with manifold absolute pressure to estimate the compressor flow. In this case, estimates of compressor flow may be used to determine if the compressor is operating near surge or choke flow conditions.

Next at 904, method 900 may include determining if the compressor flow is above a lower threshold flow level. As an example, the lower threshold flow level may be determined as a function of a rotational speed of the compressor wheel and mean air flow rate through the compressor. In another example, the lower threshold flow level be a mass flow rate that is smaller than a mass flow at a peak efficiency point of the compressor at the given rotation speed. If the compressor flow is not greater than the threshold flow level, the method proceeds to 906, otherwise the method proceeds to 908.

At 906, the engine controller may adjust the actuator to selectively move the slidable sleeve (relative to the inner casing of the casing treatment) to a position, where a plurality of sleeve slots (e.g., sleeve slots 236 in FIG. 2A) on the slidable sleeve align with surge slots (e.g., surge slots 250 in FIG. 2A) on the inner casing and the sleeve slots are not aligned with choke slots (e.g., choke slots 248 in FIG. 2A). For example, upon receiving signals from various sensors, the engine controller may send control signals to the actuator unit of the actuator assembly to actuate the slidable sleeve along the inner casing to the position where the sleeve slots are aligned with the surge slots (e.g., surge slots are open) and the sleeve slots are not aligned with choke slots (e.g., choke slots closed). In this case, air may be recirculated from a compressor wheel in the casing treatment back to a compressor inlet (e.g., inlet 405 in FIG. 4A) via the surge slots. Since, the choke slots are closed, no airflow reaches the compressor wheel in the inner casing via the choke slots.

Next at 908, the method 900 may include determining if the compressor flow is above an upper threshold flow level. As an example, the upper threshold flow level may be determined as a function of the rotational speed of the compressor wheel and compressor flow rate, for example the choke flow of the compressor without casing treatment. The upper threshold flow level may be specific to a particular engine or turbocharger compressor, for example. If the compressor flow is greater than the upper threshold value, the method proceeds to 910, otherwise the method proceeds to 912.

At 910, the engine controller may adjust the actuator to selectively move the slidable sleeve, relative to the inner casing of the casing treatment, to a position where the plurality of sleeve slots on the slidable sleeve align with the choke slots on the inner casing. When in alignment with the sleeve slots on the slidable sleeve, the surge slots on the inner casing may be partially or fully open while the choke slots are closed. In this case, additional air may be delivered to the compressor wheel in the inner casing of the casing treatment to extend choke flow conditions. Since, the surge slots are closed, no airflow is recirculated from the compressor wheel in the inner casing back to the compressor inlet.

At 912, the engine controller may adjust the actuator to selectively move the slidable sleeve, relative to the inner casing of the casing treatment, to a position where the plurality of sleeve slots on the slidable sleeve do not align with the choke and surge slots on the inner casing. When not in alignment with the sleeve slots on the slidable sleeve, the choke and surge slots on the inner casing are closed. Since, the choke slots are closed, no airflow reaches the compressor wheel in the inner casing via the choke slots. When the surge slots are closed, no airflow is recirculated from the compressor wheel in the inner casing back to the compressor inlet. In this case, the air entering the compressor is compressed by the compressor wheel and delivered to an air intake manifold where the air is further conveyed to one or more engine cylinders to mix with injected fuel prior to combustion. The method then proceeds to exit.

The example method described in FIG. 9 may be adjusted to apply to the second embodiment of the slidable sleeve (e.g., slidable sleeve 620 shown in FIGS. 6A and 6B). In this case, a position of the slidable sleeve along the casing treatment may be adjusted based on engine operations to a first position and a second position. In the first position, the slidable sleeve is actuated relative to the casing treatment such that the sleeve slots on the slidable sleeve are aligned with the choke slots (e.g., choke slots are open) and surge slots (e.g., surge slots are open). In the second position, the slidable sleeve is actuated relative to the casing treatment such that the sleeve slots on the slidable sleeve are not aligned with the choke slots (e.g., choke slots are closed) and the surge slots (e.g., surge slots are closed). In this example method involving the second embodiment of the slidable sleeve, the surge slots on the casing treatment may be always open when the slidable sleeve is adjusted between the first and second position.

In this way, an engine controller may control the actuator assembly to selectively adjust the position of the slidable sleeve relative to the casing treatment, thereby changing the alignment of sleeve slots on the slidable sleeve relative to choke or surge slots on the casing treatment to accommodate a wide range of airflow conditions while increasing compressor efficiency.

The actuator assembly coupled to the slidable sleeve of the compressor may confer several advantages. For example, movements of the rotatable element, connector rod and lever arm may allow the fork arm and slidable sleeve to slide along the casing treatment (to vary alignment of the sleeve slots relative to the choke and surge slots) without taking up much space and/or fit within a space allotted by the compressor (e.g., fit adjacent to a volute of a compressor casing while being mounted to a wall of the compressor casing). In this case, the actuator assembly provides for a compact system for adjusting compressor flow geometry to accommodate a wide range of air flow conditions in the compressor. Further, the movement of the fork arm and slidable sleeve, may occur only in an axial direction parallel to the inlet air flow. The technical effect of moving the fork arm in the axial direction without rotating the slidable sleeve, may minimize a tendency of the slidable sleeve to bind to the casing treatment. The technical effect of adjusting the actuator system as described herein, may include providing a fast response of the compressor to meet engine operating requirements. Further, the technical effect of transferring linear motion, in an axial direction with respect to a rotational axis of the compressor to the fork arm (positioned around and coupled to the slidable sleeve), via the actuator assembly, moves the slidable sleeve in the axial direction along an outer surface of the inner casing of the casing treatment of the compressor to cover and uncover slots in the inner casing. In this way, the slidable sleeve may be easily adjusted through a plurality of positions along the inner casing of the casing treatment without binding to the casing treatment.

In one example, an actuator assembly for a slidable sleeve of a turbocharger compressor, may comprise: a fork arm coupled to the slidable sleeve; a rotatable lever arm coupled to the fork arm via a rigid connecting shaft; a connector rod coupled between the lever arm and a rotatable element; and an actuator unit coupled to the rotatable element and attached to an attachment case, the attachment case coupled to the turbocharger compressor. In the preceding example, additionally or optionally, the actuator unit is adapted to translate the connector rod, in an axial direction via rotation of the rotatatable element, wherein the connector rod is adapted to rotate the lever arm and connecting shaft, and wherein the connecting shaft is adapted to translate the fork arm and slidable sleeve in the axial direction.

In any or all of the preceding examples, additionally or optionally, the slidable sleeve includes a plurality of slots arranged around a circumference of the slidable sleeve and wherein the slidable sleeve is adapted to surround an inner casing of an inlet of the turbocharger compressor. In any or all of the preceding examples, additionally or optionally, the fork arm includes an annular portion coupled around the rigid connecting shaft and a curved portion that curves around an outer surface of the slidable sleeve, where distal ends of the curved portion of the fork arm are directly coupled to the outer surface of the slidable sleeve, adjacent to the sleeve slots. In any or all of the preceding examples, additionally or optionally, the connector rod is coupled to the lever arm via a first pivot joint and coupled to the rotatable element via a second pivot joint. In any or all of the preceding examples, additionally or optionally, the actuator unit is one of an electric, a pneumatic, or a hydraulic actuator.

An example method may comprise: via an actuator assembly, transferring linear motion, in an axial direction with respect to a rotational axis of a compressor, to a fork arm positioned around and coupled to a slidable sleeve, to move the slidable sleeve in the axial direction along an outside of an inner casing of a casing treatment of a compressor to cover and uncover slots in the inner casing. In any or all of the preceding examples, additionally or optionally, transferring linear motion to the slidable sleeve includes rotating a rotatable element directly coupled to a first end of a connector rod to translate the connector rod in the axial direction, where a second end of the connector rod is directly coupled to a first end of a lever arm. In any or all of the preceding examples, additionally or optionally, transferring linear motion to the slidable sleeve further includes pivoting the lever arm via the translation of the connector rod in the axial direction to translate a rigid connecting shaft coupled to the fork arm linearly, in the axial direction. In any or all of the preceding examples, additionally or optionally, transferring linear motion to the slidable sleeve includes translating the connector rod in a positive axial direction, toward a compressor wheel of the compressor, to transfer linear motion to the slidable sleeve and translate the slidable sleeve in a negative axial direction, away from the compressor wheel.

A further example method may comprise: in response to a first engine operating condition, transferring linear motion in the axial direction to the fork arm to move the slidable sleeve to uncover surge slots of the inner casing and cover choke slots of the inner casing, the surge slots positioned upstream of the choke slots on the inner casing, relative to a direction of air flow through the inner casing; in response to a second engine operating condition, transferring linear motion in the axial direction to the fork arm to move the slidable sleeve to uncover choke slots of the inner casing and cover surge slots of the inner casing; and in response to a third engine operating condition, transferring linear motion in the axial direction to the fork arm to move the slidable sleeve to cover both choke slots and surge slots of the inner casing.

Any or all of the further examples, additionally or optionally may comprise: in response to a fourth engine operating condition, transferring linear motion in the axial direction to the fork arm to move the slidable sleeve to uncover both choke slots and surge slots of the inner casing, the surge slots positioned upstream of the choke slots on the inner casing, relative to a direction of air flow through the inner casing; and in response to a fifth engine operating condition, transferring linear motion in the axial direction to the fork arm to move the slidable sleeve to cover the choke slots and uncover the surge slots of the inner casing.

An example turbocharger compressor for an engine may comprise: a compressor wheel; a casing treatment having an inner casing surrounding at least a portion of the compressor wheel, the inner casing including a first plurality of slots and a second plurality of slots, the first plurality of slots positioned upstream of the second plurality of slots; a slidable sleeve surrounding at least a portion of the inner casing and including a plurality of sleeve slots arranged around a circumference of the slidable sleeve; and an actuator assembly including: a fork arm coupled to the slidable sleeve; a lever arm coupled to the fork arm and a connector rod; and an actuator coupled to the connector rod and adapted to translate the slidable sleeve along the inner casing to vary alignment of the plurality of sleeve slots with the first plurality of slots and the second plurality of slots.

In the preceding example, additionally or optionally, the first plurality of slots are positioned adjacent to a plurality of splitter blades of the compressor wheel and the second plurality of slots are positioned adjacent to a plurality of full blades of the compressor wheel, the plurality of full blades positioned upstream of the plurality of splitter blades.

In the preceding examples, additionally or optionally, the first plurality of slots on the inner casing are positioned in a range of 25% to 50% along a streamwise location of the compressor wheel between an inlet end and an outlet let end of the inner casing, and the second plurality of slots on the inner casing are positioned in a range of 5% to 15% along the streamwise location of the compressor wheel between an inlet end and an outlet let end of the inner casing.

In any or all of the preceding examples, additionally or optionally, the plurality of sleeve slots have a sleeve width larger than a slot width of the first and second plurality of slots. In any or all of the preceding examples, additionally or optionally, the slidable sleeve includes a first end positioned closer to an interior portion of the casing treatment and the compressor wheel than a second end of the slidable sleeve, wherein the plurality of sleeve slots are positioned closer to the first end than the second end, and wherein the fork arm is coupled to the slidable sleeve at a position that is closer to the second end than the plurality of sleeve slots relative to the second end.

In the preceding examples, additionally or optionally, when the slidable sleeve is adjustable into a first position where the first plurality of slots are not in alignment with the plurality of sleeve slots and the second plurality of slots are in alignment with the plurality of sleeve slots second position where the first plurality of slots and the second plurality of slots are not in alignment with the plurality of sleeve slots. In any or all of the preceding examples, additionally or optionally, wherein when the slidable sleeve is adjustable into a second position where the first plurality of slots and the second plurality of slots are not in alignment with the plurality of sleeve slots and wherein when the slidable sleeve is in the second position the plurality of sleeve slots are positioned on the inner casing, between the first plurality of slots and the second plurality of slots. In the preceding examples, additionally or optionally, when the slidable sleeve is adjustable into a third position where the first plurality of slots are in alignment with the plurality of sleeve slots and the second plurality of slots are not in alignment with the plurality of sleeve slots.

In another representation, an example turbocharger compressor for an engine may comprise: a compressor wheel; a casing treatment having an inner casing surrounding at least a portion of the compressor wheel, the inner casing including a first plurality of slots and a second plurality of slots, the first plurality of slots positioned downstream of the second plurality of slots; a slidable sleeve surrounding at least a portion of the inner casing and including a solid ring, a plurality of protruding elements extending from the solid ring, around a circumference of the solid ring, and a plurality of sleeve openings formed between the plurality of protruding elements; and an actuator assembly including: a fork arm coupled to the slidable sleeve; a lever arm coupled to the fork arm and a connector rod; and an actuator coupled to the connector rod and adapted to translate the slidable sleeve along the inner casing to vary alignment of the plurality of sleeve openings with the first plurality of slots and the second plurality of slots.

In the preceding examples, additionally or optionally, the plurality of sleeve openings are formed between the protruding elements and an inner circumferential edge of the solid ring and wherein the solid ring is arranged further inward on the slidable sleeve than the plurality of sleeve openings relative to the compressor wheel. In any or all of the preceding examples, additionally or optionally, the slidable sleeve is adjustable into a first position where the first plurality of slots and the second plurality of slots are in alignment with the plurality of sleeve openings. In any or all of the preceding examples, additionally or optionally, the slidable sleeve is adjustable into a second position where the first plurality of slots are not in alignment with the plurality of sleeve openings and the second plurality of slots are in alignment with the plurality of sleeve openings.

In another representation, an example method may comprise: adjusting a slidable sleeve surrounding an inner casing of a turbocharger compressor, the inner casing surrounding at least a portion of a compressor wheel, into a first position where a plurality of sleeve slots arranged around a circumference of the slidable sleeve are aligned with a first plurality of slots of the inner casing and not aligned with a second plurality of slots of the inner casing, the second plurality of slots arranged upstream of the first plurality of slots on the inner casing relative to a direction of air flow through the inner casing to the compressor wheel; adjusting the slidable sleeve into a second position where the plurality of sleeve slots are not aligned with the first plurality of slots or a second plurality of slots of the inner casing; and adjusting the slidable sleeve into a third position where the plurality of sleeve slots are aligned with the second plurality of slots and not the first plurality of slots.

In the preceding example, additionally or optionally, adjusting the slidable sleeve into the second position includes positioning the plurality of sleeve slots at position along the inner casing, between the first plurality of slots and the second plurality of slots. In the preceding examples, additionally or optionally, adjusting the slidable sleeve into each of the first, second, and third positions includes actuating an actuator to translate a connecting rod in an axial direction, the axial direction defined in a direction of a rotational axis of the compressor wheel, where the translation of the connecting rod rotates a lever arm coupled to the connecting arm which translates a fork arm coupled to each of the lever arm and the slidable sleeve in the axial direction.

Another example method may comprise: adjusting a slidable sleeve surrounding an inner casing of a turbocharger compressor, the inner casing surrounding at least a portion of a compressor wheel, into a first position where a plurality of sleeve openings arranged around a circumference of the slidable sleeve are aligned with a first plurality of slots of the inner casing and not aligned with a second plurality of slots of the inner casing, the second plurality of slots arranged upstream of the first plurality of slots on the inner casing relative to a direction of air flow through the inner casing to the compressor wheel; adjusting the slidable sleeve into a second position where the plurality of sleeve openings are not aligned with the first plurality of slots and aligned with the second plurality of slots.

In the preceding example, additionally or optionally, adjusting the slidable sleeve into each of the first and second positions includes actuating an actuator to translate a connecting rod in an axial direction, the axial direction defined in a direction of a rotational axis of the compressor wheel, where the translation of the connecting rod rotates a lever arm coupled to the connecting arm which translates a fork arm coupled to each of the lever arm and the slidable sleeve in the axial direction.

FIGS. 1-8 show example configurations with relative positioning of the various components of the slidable valve actuation system for the turbocharger compressor. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An actuator assembly for a slidable sleeve of a turbocharger compressor, comprising:
    a fork arm coupled to the slidable sleeve;
    a rotatable lever arm coupled to the fork arm via a rigid connecting shaft;
    a connector rod coupled between the lever arm and a rotatable cam,
    the rotatable cam extending between the connector rod and an actuator unit, and the actuator unit coupled to the rotatable cam and attached to an attachment case, the attachment case coupled to the turbocharger compressor, rotation of the rotatable cam translating the connector rod, the connector rod rotating the lever arm and the connecting shaft, the connecting shaft translating the fork arm and the slidable sleeve in an axial direction.

2. The actuator assembly of claim 1, wherein the slidable sleeve includes a plurality of slots arranged around a circumference of the slidable sleeve and wherein the slidable sleeve is adapted to surround an inner casing of an inlet of the turbocharger compressor.

3. The actuator assembly of claim 2, wherein the fork arm includes an annular portion coupled around the connecting shaft and a curved portion that curves around an outer surface of the slidable sleeve, where distal ends of the curved portion of the fork arm are directly coupled to the outer surface of the slidable sleeve, adjacent to the plurality of slots of the sleeve.

4. The actuator assembly of claim 1, wherein the connector rod is coupled to the lever arm via a first pivot joint and coupled to the rotatable cam via a second pivot joint.

5. The actuator assembly of claim 1, wherein the actuator unit is one of an electric, a pneumatic, or a hydraulic actuator.

6. A method, comprising:
via an actuator assembly, transferring linear motion, in an axial direction with respect to a rotational axis of a compressor, to a fork arm positioned around and coupled to a slidable sleeve, to move the slidable sleeve in the axial direction along an outside of an inner casing of a casing treatment of a compressor to cover and uncover slots in the inner casing,
the actuator assembly rotating a rotatable cam directly coupled to a first end of a connector rod to translate the connector rod in the axial direction, the rotatable cam extending between the first end of the connector rod and the actuator assembly, where a second end of the connector rod is directly coupled to a first end of a lever arm and pivoting the lever arm via the translation of the connector rod in the axial direction to translate a rigid connecting shaft coupled to the fork arm.

7. The method of claim 6, wherein transferring linear motion to the slidable sleeve includes translating the connector rod in a positive axial direction, toward a compressor wheel of the compressor, to transfer linear motion to the slidable sleeve and translate the slidable sleeve in a negative axial direction, away from the compressor wheel.

8. The method of claim 6, further comprising:
in response to a first engine operating condition, transferring linear motion in the axial direction to the fork arm to move the slidable sleeve to uncover surge slots of the inner casing and cover choke slots of the inner casing, the surge slots positioned upstream of the choke slots on the inner casing, relative to a direction of air flow through the inner casing;
in response to a second engine operating condition, transferring linear motion in the axial direction to the fork arm to move the slidable sleeve to uncover the choke slots of the inner casing and cover the surge slots of the inner casing; and
in response to a third engine operating condition, transferring linear motion in the axial direction to the fork arm to move the slidable sleeve to cover both the choke slots and the surge slots of the inner casing.

9. The method of claim 6, further comprising:
in response to a fourth engine operating condition, transferring linear motion in the axial direction to the fork arm to move the slidable sleeve to uncover both choke slots and surge slots of the inner casing, the surge slots positioned upstream of the choke slots on the inner casing, relative to a direction of air flow through the inner casing; and
in response to a fifth engine operating condition, transferring linear motion in the axial direction to the fork arm to move the slidable sleeve to cover the choke slots and uncover the surge slots of the inner casing.

10. A turbocharger compressor for an engine, comprising:
a compressor wheel;
a casing treatment having an inner casing surrounding at least a portion of the compressor wheel, the inner casing including a first plurality of slots and a second plurality of slots, the first plurality of slots positioned upstream of the second plurality of slots;
a slidable sleeve surrounding at least a portion of the inner casing and including a plurality of sleeve slots arranged around a circumference of the slidable sleeve, the plurality of sleeve slots having a sleeve width larger than a slot width of the first and second pluralities of slots; and
an actuator assembly including:
a fork arm coupled to the slidable sleeve;
a lever arm coupled to the fork arm and a connector rod; and
an actuator coupled to the connector rod and adapted to translate the slidable sleeve along the inner casing to vary alignment of the plurality of sleeve slots with the first plurality of slots and the second plurality of slots.

11. The turbocharger compressor of claim 10, wherein the first plurality of slots is positioned adjacent to a plurality of full blades of the compressor wheel and the second plurality of slots is positioned adjacent to a plurality of splitter blades of the compressor wheel, the plurality of full blades positioned upstream of the plurality of splitter blades.

12. The turbocharger compressor of claim 10, wherein the first plurality of slots on the inner casing is positioned in a range of 25% to 50% along a flow direction length of the compressor wheel between an inlet end and an outlet end of the inner casing, and the second plurality of slots on the inner casing is positioned in a range of 5% to 15% along the flow direction length of the compressor wheel between the inlet end and the outlet end of the inner casing.

13. The turbocharger compressor of claim 10, wherein the slidable sleeve includes a first end positioned closer to an interior portion of the casing treatment and the compressor wheel than a second end of the slidable sleeve, wherein the plurality of sleeve slots is positioned closer to the first end than the second end, and wherein the fork arm is coupled to the slidable sleeve at a position that is closer to the second end than the plurality of sleeve slots relative to the second end.

14. The turbocharger compressor of claim 10, wherein the slidable sleeve is adjustable into a first position where the first plurality of slots is not in alignment with the plurality of sleeve slots and the second plurality of slots is in alignment with the plurality of sleeve slots.

15. The turbocharger compressor of claim 10, wherein the slidable sleeve is adjustable into a second position where the first plurality of slots and the second plurality of slots are not in alignment with the plurality of sleeve slots and wherein, when the slidable sleeve is in the second position, the plurality of sleeve slots is positioned on the inner casing, between the first plurality of slots and the second plurality of slots.

16. The turbocharger compressor of claim 10, wherein the slidable sleeve is adjustable into a third position where the first plurality of slots is in alignment with the plurality of sleeve slots and the second plurality of slots is not in alignment with the plurality of sleeve slots.

* * * * *